United States Patent
Wang et al.

(10) Patent No.: US 12,445,954 B2
(45) Date of Patent: Oct. 14, 2025

(54) METHOD AND DEVICE FOR CONFIGURING A QUANTITY OF SWEEPING BEAMS

(71) Applicant: Huawei Technologies Co., Ltd., Shenzhen (CN)

(72) Inventors: Man Wang, Shanghai (CN); Zhiqiang Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 18/154,612

(22) Filed: Jan. 13, 2023

(65) Prior Publication Data
US 2023/0147737 A1 May 11, 2023

Related U.S. Application Data

(63) Continuation of application No. PCT/CN2021/105210, filed on Jul. 8, 2021.

(30) Foreign Application Priority Data

Jul. 15, 2020 (CN) .......................... 202010685117.3

(51) Int. Cl.
*H04W 52/02* (2009.01)
*H04W 72/044* (2023.01)
*H04W 72/52* (2023.01)

(52) U.S. Cl.
CPC ..... *H04W 52/0206* (2013.01); *H04W 72/044* (2013.01); *H04W 72/52* (2023.01)

(58) Field of Classification Search
CPC ............. H04W 52/0206; H04W 72/52; H04W 72/044; H04W 88/08; H04W 72/046;
(Continued)

(56) References Cited

U.S. PATENT DOCUMENTS

| 9,674,709 B2 | 6/2017 | Wu et al. |
| 10,003,986 B2 | 6/2018 | Liu et al. |

(Continued)

FOREIGN PATENT DOCUMENTS

| CN | 103945393 | * | 7/2014 |
| CN | 103945393 A | | 7/2014 |

(Continued)

OTHER PUBLICATIONS

ZTE, "Beam grouping evaluation for beam management", 3GPP TSG RAN WG1 NR Ad-Hoc#2, R1-1710186, Qingdao, P.R. China, Jun. 27-30, 2017, 10 pages.

(Continued)

*Primary Examiner* — Mewale A Ambaye
(74) *Attorney, Agent, or Firm* — Slater Matsil, LLP

(57) ABSTRACT

This application provides a communication method, applied to beam sweeping. The method includes: obtaining system load of a cell at a current moment; configuring a quantity of sweeping beams in a sweeping periodicity based on the system load at the current moment; and configuring a quantity of shutdown symbols based on the quantity of sweeping beams. This application further provides a communication apparatus, a communication device, and a computer-readable storage medium, to resolve a technical problem in a conventional technology that a plurality of symbols are always in a power consumption state and energy overheads are high because a fixed quantity of beams are used for sweeping to enhance coverage, so that a base station saves more energy.

20 Claims, 11 Drawing Sheets

(58) Field of Classification Search
CPC ... H04W 72/53; H04W 72/23; H04W 72/542; Y02D 30/70; H04B 7/06952
See application file for complete search history.

(56) References Cited

U.S. PATENT DOCUMENTS

| | | | | |
|---|---|---|---|---|
| 2011/0142108 | A1* | 6/2011 | Agee | H04B 7/10 375/219 |
| 2022/0030519 | A1* | 1/2022 | Zhou | H04W 4/021 |
| 2023/0147737 | A1* | 5/2023 | Wang | H04W 52/0206 |
| 2023/0198717 | A1* | 6/2023 | Elshafie | H04L 5/0091 370/329 |
| 2023/0199659 | A1* | 6/2023 | Zhou | H04L 5/0078 370/318 |
| 2024/0334415 | A1* | 10/2024 | Li | H04B 7/088 |

FOREIGN PATENT DOCUMENTS

| | | | |
|---|---|---|---|
| CN | 105814809 A | | 7/2016 |
| CN | 106716930 A | | 5/2017 |
| CN | 106793059 A | | 5/2017 |
| CN | 106817762 | * | 6/2017 |
| CN | 106817762 A | | 6/2017 |
| CN | 107819200 A | | 3/2018 |
| CN | 111225433 A | | 6/2020 |
| EP | 3637651 A1 | * | 4/2020 .......... H04B 7/0626 |

OTHER PUBLICATIONS

ZTE, "Beam grouping evaluation for beam management", 3GPP TSG RAN WG1 Meeting #89, R1-1707122, Hangzhou, P.R. China, May 15-19, 2017, 10 pages.

"Schedule single vs. multiple beams per frame for E-UTRA," Source: Ericsson, Agenda Item: 8.7.2, Document for: Discussion, 3GPP TSG RAN WG1 Meeting #46, R1-062282, Tallin, Estonia, Aug. 28-Sep. 1, 2006, 5 pages.

"Discussion of Potential Techniques for NR Positioning," Source: CATT, Agenda Item: 7.2.10.3, Document for: Discussion and Decision, 3GPP TSG RAN WG1 Meeting #95, R1-1812615, Spokane, USA, Nov. 12-16, 2018, 13 pages.

* cited by examiner

METHOD AND DEVICE FOR CONFIGURING A QUANTITY OF SWEEPING BEAMS

CROSS-REFERENCE TO RELATED APPLICATIONS

This application is a continuation of International Application No. PCT/CN2021/105210 filed on Jul. 8, 2021, which claims priority to Chinese Patent Application No. 202010685117.3, filed on Jul. 15, 2020. The disclosures of the aforementioned applications are herein incorporated by reference in their entireties.

TECHNICAL FIELD

This application relates to the computer field, and in particular, to a communication method, a related apparatus device, and a computer-readable storage medium.

BACKGROUND

With an increase in a bandwidth and a capability of a mobile communication system, a rate of a mobile network also increases rapidly. A next-generation mobile communication system is a multi-service and multi-technology convergence network with a higher rate, a higher bandwidth, and a stronger capability, and improves power efficiency by more than 100 times and reduces bit costs.

As a result, an energy consumption problem of a base station becomes more prominent. Basic features and main objectives of a current network are a high rate, a low latency, massive device connections, and low power consumption. For the low power consumption, a main objective is that the base station saves more energy and a terminal saves more power. Therefore, it is particularly important to design a more energy-saving base station sending solution.

SUMMARY

This application provides a communication method, a communication apparatus, a communication device, and a computer-readable storage medium, to resolve a technical problem of high energy consumption of a base station in a conventional technology, so that the base station saves more energy.

According to a first aspect, an embodiment of this application provides a communication method, applied to beam sweeping. The method includes:

An interface device (for example, a base station) operating in a wireless environment obtains system load of a cell at a current moment; configures a quantity of sweeping beams in a sweeping periodicity based on the system load at the current moment; and configures a quantity of shutdown symbols based on the quantity of sweeping beams.

In this embodiment of this application, the quantity of sweeping beams is configured based on the system load at the current moment, and the system load at the current moment is directly associated with a quantity of RBs used by a system at the current moment. In this case, available power for beam sweeping may be estimated based on the system load at the current moment. Lighter system load at the current moment indicates greater available power. In other words, power of more idle RBs may be subsequently aggregated to an RB of the sweeping beam based on a specific case, so that the sweeping beam can cover a wider area with a same coverage distance. In other words, when the system load at the current moment is light, the configured quantity of sweeping beams in the sweeping periodicity is less than an original quantity, and original coverage can also be achieved. The configured quantity of sweeping beams is reduced, and a symbol that is not currently used for beam sweeping may be shut down, so that beam sweeping is performed by using fewer symbols, a quantity of shutdown symbols is increased, and a quantity of transmit symbols is reduced. This resolves a technical problem in a conventional technology that a plurality of symbols are always in a power consumption state and energy overheads are high because a fixed quantity of beams are used for sweeping to enhance coverage, so that the base station saves more energy.

In a possible implementation, the communication method in this embodiment of this application further includes: aggregating, on a configured symbol of the sweeping beam, power of an idle resource block RB to a to-be-occupied RB.

In this embodiment of this application, the power of the idle RB is aggregated to the to-be-occupied RB on the symbol of the sweeping beam, so that the sweeping beam can cover the wider area with the same coverage distance. In this case, the configured quantity of sweeping beams in the sweeping periodicity is less than the original quantity, and the original coverage can also be achieved. Therefore, the configured quantity of sweeping beams may be reduced, and the symbol that is not currently used for beam sweeping may be shut down, so that beam sweeping is performed by using the fewer symbols, the quantity of shutdown symbols is increased, and the quantity of transmit symbols is reduced. This resolves the technical problem in the conventional technology that the plurality of symbols are always in the power consumption state and the energy overheads are high because the fixed quantity of beams are used for sweeping to enhance coverage, so that the base station saves more energy.

In a possible implementation, the interface device (for example, the base station) operating in the wireless environment may set to periodically monitor the system load at the current moment, or continuously monitoring the system load at the current moment, to obtain the system load at the current moment; and configures the quantity of sweeping beams in the sweeping periodicity and a beam width of each sweeping beam.

In this case, the system load at the current moment is monitored periodically or continuously, to dynamically configure or adjust the quantity of sweeping beams and dynamically configure the quantity of shutdown symbols, so that sweeping beam adjustment can be more adaptively completed, and energy overheads of the base station can be adjusted in a more timely and balanced manner.

In a possible implementation, a lower current load level indicates a smaller configured quantity of sweeping beams in the periodicity, the current load level is a load level of the system load at the current moment, and system load at a low load level is less than system load at a high load level.

A plurality of load levels are set to correspond to configured quantities of sweeping beams, and different load levels may correspond to different configured quantities of sweeping beams, so that sweeping beam adjustment can be quickly completed. This resolves the technical problem in the conventional technology that the plurality of symbols are always in the power consumption state and the energy overheads are high because the fixed quantity of beams are used for sweeping to enhance coverage, so that the base station saves more energy.

In a possible implementation, the configuring a quantity of sweeping beams in a sweeping periodicity based on the system load at the current moment may include: estimating available power for beam sweeping based on the system load at the current moment; and configuring the quantity of sweeping beams in the sweeping periodicity based on the available power.

The available power for beam sweeping may include power of the to-be-occupied RB obtained after the power of the idle RB is aggregated to the to-be-occupied RB.

In this embodiment of this application, the available power is first estimated by learning of the system load at the current moment, and then the quantity of sweeping beams in the sweeping periodicity is configured based on the available power, so that sweeping beam adjustment can be completed more accurately. This better resolves the technical problem in the conventional technology that the plurality of symbols are always in the power consumption state and the energy overheads are high because the fixed quantity of beams are used for sweeping to enhance coverage, so that the base station saves more energy.

In a possible implementation, a higher current power level indicates a smaller configured quantity of sweeping beams, the current power level is a power level of the available power, and available power at a high power level is greater than available power at a low power level.

A plurality of power levels are set to correspond to configured quantities of sweeping beams, and different power levels may correspond to different configured quantities of sweeping beams, so that sweeping beam adjustment can be quickly completed. This resolves the technical problem in the conventional technology that the plurality of symbols are always in the power consumption state and the energy overheads are high because the fixed quantity of beams are used for sweeping to enhance coverage, so that the base station saves more energy.

In a possible implementation, before the configuring a quantity of sweeping beams in a sweeping periodicity and a beam direction and a beam width of each sweeping beam based on the system load at the current moment, the method further includes: obtaining the system load at the current moment through prediction based on historical system load.

Specifically, the system load at the current moment may be predicted by collecting statistics about historical load, to obtain a distribution rule of the system load in a time periodicity. Alternatively, the system load at the current moment is predicted based on distribution of the system load in a preset previous time period. Therefore, the system load at the current moment is accurately obtained. When the system load at the current moment is light, the symbol that is not currently used for beam sweeping may be shut down, so that beam sweeping is performed by using the fewer symbols, the quantity of shutdown symbols is increased, and the quantity of transmit symbols is reduced.

In a possible implementation, the communication method in this embodiment of this application further includes: configuring a beam width of each sweeping beam based on the quantity of sweeping beams. In this embodiment of this application, the beam width of each sweeping beam is configured, so that beam sweeping coverage can be better performed when the configured quantity of sweeping beams in the sweeping periodicity is less than the original quantity, to achieve the original coverage.

In a possible implementation, the configuring a beam width of a sweeping beam based on the quantity of sweeping beams may include: determining, based on the quantity of sweeping beams, one or more resource elements REs corresponding to each sweeping beam, where a width of the sweeping beam is superposed by beams corresponding to the one or more corresponding REs.

In this embodiment of this application, after the one or more REs corresponding to each sweeping beam are determined based on the quantity of sweeping beams, the beam width of each sweeping beam is obtained by superposing beams corresponding to the REs corresponding to the sweeping beam, and finally, the beam width required by the sweeping beam may be generated. Therefore, the beam width of the sweeping beam may be configured by controlling a phase offset of a beam corresponding to each RE, so that coverage of the sweeping beam can be improved.

In a possible implementation, after the determining, based on the quantity of sweeping beams, one or more resource elements REs corresponding to each sweeping beam, the method may further include: adjusting a latency step based on a scheduling bandwidth; obtaining, based on the latency step, precoding matrix weight values of the REs corresponding to the sweeping beam; and performing, based on the precoding matrix weight values, weighted traversal on the REs corresponding to the sweeping beam.

In this embodiment of this application, the latency step is adjusted based on the scheduling bandwidth, and then the precoding matrix weight values of the REs corresponding to the sweeping beam are obtained based on the latency step, that is, a group of precoding matrix weight values configured for different resource elements REs are obtained. Then, weighted traversal is performed on the REs corresponding to the sweeping beam based on the precoding matrix weight values, so that a wide beam with any bandwidth can be generated. Wide coverage of beams in a specific bandwidth can be achieved by adjusting an offset between different weight values, to further improve a coverage angle.

Specifically, this may be implemented by using the following formulas:

$$S(k) = W_{PSD}(k) * s(k) = \frac{1}{\sqrt{N_{TRX}}} * \left[1 \quad e^{-j\theta(k)} \quad \ldots \quad e^{-j(\theta((N_{TRX}-1)*k)+\varphi)}\right]^T * s(k)$$

$$\theta(k) = 2\pi D \frac{k}{N_{FFT}}, \text{ where } k = 0, 1, \ldots, N_{RE} - 1$$

$$D = \frac{N_{FFT}}{N_{RB} * 12}$$

S(k) is a signal that is weighted by using a precoding matrix, s(k) is a transmitted signal, and $W_{PSD}(k)$ is different precoding matrix weight values traversed on different REs in frequency domain. $N_{TRX}$ is a quantity of antennas. $N_{RE}$ is a quantity of REs, and k is an RE number.

The latency step value D is related to a quantity of RBs ($N_{RE}$) and an FFT specification ($N_{FFT}$). The value D is adjusted based on the scheduling bandwidth to ensure that the value D matches the scheduling bandwidth. A phase in the scheduling bandwidth is rotated for a complete periodicity to avoid a beam coverage hole. Finally, a wide beam in a specific bandwidth can be generated.

In a possible implementation, the communication method in this embodiment of this application further includes:

The interface device (for example, the base station) operating in the wireless environment controls a beam direction of the sweeping beam based on a position of a terminal device.

In this embodiment of this application, the position of the terminal device is learned of or obtained, for example, based on statistics about historical user data, long-term analysis or perception of a rule of user data, or terrain position statistics. Then, a fixed position which a beam faces may be determined based on the position of the terminal device, and the beam direction of the sweeping beam is controlled by configuring a phase difference between channels or selecting one or more beams from basic beams, so that the beam faces an expected direction. Because the beam direction of the sweeping beam may be determined based on the position of the terminal device, omnidirectional coverage sweeping is not required, and a narrow beam may be designed, so that the quantity of sweeping beams is further reduced, the quantity of shutdown symbols is further improved, and the quantity of transmit symbols is reduced. This resolves the technical problem in the conventional technology that the plurality of symbols are always in the power consumption state and the energy overheads are high because the fixed quantity of beams are used for sweeping to enhance coverage, so that the base station saves more energy.

In a possible implementation, the configured beam direction of the sweeping beam is staggered with or different from a beam direction of a neighboring cell of the cell.

In this embodiment of this application, the beam direction of the neighboring cell may be staggered by adjusting the phase difference between channels or designing different weight values, so that a beam difference is formed between the cell and the neighboring cell, to reduce inter-cell interference. A problem that inter-cell interference is easily generated because to save a resource and shut down a symbol, a symbol is designed to carry data when the symbol is used to send a common channel is avoid.

In a possible implementation, if a shutdown sweeping symbol is configured in the sweeping periodicity, a time domain symbol of a transmit beam is staggered with or different from a time domain symbol of a transmit beam of the neighboring cell of the cell.

In this embodiment of this application, when the shutdown sweeping symbol is configured in the sweeping periodicity, time domain symbols of beams between neighboring cells are staggered, that is, time domain symbols of beams between neighboring cells are different, so that inter-cell interference can be further reduced, and system efficiency can be improved.

According to a second aspect, an embodiment of this application provides a communication method, including: controlling a beam direction based on a position of a terminal device in a cell, and determining a quantity of sweeping beams; and determining, based on the quantity of sweeping beams, one or more resource elements REs corresponding to each sweeping beam, where a width of the sweeping beam is superposed by beams corresponding to the one or more corresponding REs.

In this embodiment of this application, the position of the terminal device is learned of or obtained, for example, based on statistics about historical user data, long-term analysis or perception of a rule of user data, or terrain position statistics. Then, a fixed position which a beam faces may be determined based on the position of the terminal device, and the beam direction is controlled by configuring a phase difference between channels or selecting one or more beams from basic beams. Because the beam direction of the sweeping beam may be determined based on the position of the terminal device, and the quantity of sweeping beams may be determined, omnidirectional coverage sweeping is not required, and a narrow beam is designed, so that beam sweeping may be avoided or the quantity of sweeping beams may be reduced. In addition, if the quantity of sweeping beams is reduced, a quantity of shutdown symbols may be configured based on the quantity of sweeping beams, to increase a quantity of shutdown symbols and reduce a quantity of transmit symbols. This resolves a technical problem in a conventional technology that a plurality of symbols are always in a power consumption state and energy overheads are high because a fixed quantity of beams are used for sweeping to enhance coverage, so that a base station saves more energy. In addition, after the one or more REs corresponding to each sweeping beam are determined based on the quantity of sweeping beams, the beam width of each sweeping beam is obtained by superposing beams corresponding to the REs corresponding to the sweeping beam, and finally, the beam width required by the sweeping beam may be generated. Therefore, the beam width of the sweeping beam may be configured by controlling a phase offset of a beam corresponding to each RE, so that coverage of the sweeping beam can be improved.

In a possible implementation, after the determining, based on the quantity of sweeping beams, one or more resource elements REs corresponding to each sweeping beam, the method may further include: adjusting a latency step based on a scheduling bandwidth; obtaining, based on the latency step, precoding matrix weight values of the REs corresponding to the sweeping beam; and performing, based on the precoding matrix weight values, weighted traversal on the REs corresponding to the sweeping beam.

In this embodiment of this application, the latency step is adjusted based on the scheduling bandwidth, and then the precoding matrix weight values of the REs corresponding to the sweeping beam are obtained based on the latency step, that is, a group of precoding matrix weight values configured for different resource elements REs are obtained. Then, weighted traversal is performed on the REs corresponding to the sweeping beam based on the precoding matrix weight values, so that a wide beam with any bandwidth can be generated. Wide coverage of beams in a specific bandwidth can be achieved by adjusting an offset between different weight values, to further improve a coverage angle.

Specifically, this may be implemented by using the following formulas:

$$S(k) = W_{PSD}(k) * s(k) = \frac{1}{\sqrt{N_{TRX}}} * \begin{bmatrix} 1 & e^{-j\theta(k)} & \cdots & e^{-j(\theta((N_{TRX}-1)*k)+\varphi)} \end{bmatrix}^T * s(k)$$

$$\theta(k) = 2\pi D \frac{k}{N_{FFT}}, \text{ where } k = 0, 1, \ldots, N_{RE} - 1$$

$$D = \frac{N_{FFT}}{N_{RB} * 12}$$

S(k) is a signal that is weighted by using a precoding matrix, s(k) is a transmitted signal, and $W_{PSD}(k)$ is different precoding matrix weight values traversed on different REs in frequency domain. $N_{TRX}$ is a quantity of antennas. $N_{RE}$ is a quantity of REs, and k is an RE number.

The latency step value D is related to a quantity of RBs ($N_{RE}$) and an FFT specification ($N_{FFT}$). The value D is adjusted based on the scheduling bandwidth to ensure that the value D matches the scheduling bandwidth. A phase in the scheduling bandwidth is rotated for a complete periodicity to avoid a beam coverage hole. Finally, a wide beam in a specific bandwidth can be generated.

In a possible implementation, the communication method in this embodiment of this application further includes: aggregating, on a configured symbol of the sweeping beam, power of an idle resource block RB to a to-be-occupied RB.

In this embodiment of this application, the power of the idle RB is aggregated to the to-be-occupied RB on the symbol of the sweeping beam, so that the sweeping beam can cover the wider area with the same coverage distance. In this case, the configured quantity of sweeping beams in the sweeping periodicity is less than the original quantity, and the original coverage can also be achieved. Therefore, the configured quantity of sweeping beams may be further reduced, and a symbol that is not currently used for beam sweeping may be shut down, so that beam sweeping is performed by using fewer symbols, the quantity of shutdown symbols is increased, and the quantity of transmit symbols is reduced. This resolves the technical problem in the conventional technology that the plurality of symbols are always in the power consumption state and the energy overheads are high because the fixed quantity of beams are used for sweeping to enhance coverage, so that the base station saves more energy.

In a possible implementation, the controlling a beam direction based on a position of a terminal device in a cell, and determining a quantity of sweeping beams includes: when current system load is at a first load level, or when current system load is at a second load level and a proportion of the terminal device located in a first geographic area reaches a threshold, controlling the beam direction based on the position of the terminal device in the cell, and determining the quantity of sweeping beams.

Specifically, the first load level is lower than the second load level. In other words, when the current system load is light and the position of the terminal device is learned of, the beam direction may be controlled by configuring the phase difference between channels or selecting the one or more beams from the basic beams, and beam sweeping may not be required, to reduce the quantity of transmit symbols and increase the quantity of shutdown symbols. When the current system load is heavy and positions of terminal devices are centralized, the beam direction may also be controlled by configuring the phase difference between channels or selecting the one or more beams from the basic beams, and beam sweeping may not be required, to reduce the quantity of transmit symbols and increase the quantity of shutdown symbols.

In a possible implementation, the configured beam direction is staggered with a beam direction of a neighboring cell of the cell.

In this embodiment of this application, the beam direction of the neighboring cell may be staggered by adjusting the phase difference between channels or designing different weight values, so that a beam difference is formed between the cell and the neighboring cell, to reduce inter-cell interference. A problem that inter-cell interference is easily generated because to save a resource and shut down a symbol, a symbol is designed to carry data when the symbol is used to send a common channel is avoid.

In a possible implementation, if a shutdown sweeping symbol is configured in a periodicity of a transmit beam, a time domain symbol of the transmit beam is staggered with a time domain symbol of a transmit beam of the neighboring cell.

In this embodiment of this application, when the shutdown sweeping symbol is configured in the sweeping periodicity, time domain symbols of beams between neighboring cells are staggered, that is, time domain symbols of beams between neighboring cells are different, so that there is no interference between synchronization and broadcast beams of different cells, to further reduce inter-cell interference and improve system efficiency.

According to a third aspect, an embodiment of this application provides a communication method, including:

An interface device (for example, a base station) operating in a wireless environment in a cell configures a shutdown sweeping symbol in a periodicity of a transmit beam; and in a process of configuring a sweeping beam, staggers a time domain symbol of the transmit beam with a time domain symbol of a transmit beam of a neighboring cell of the cell.

In this embodiment of this application, when the shutdown sweeping symbol is configured in the sweeping periodicity, time domain symbols of beams between neighboring cells are staggered, that is, time domain symbols of beams between neighboring cells are different, so that inter-cell interference can be further reduced, and system efficiency can be improved.

In a possible implementation, the communication method in this embodiment of this application further includes: aggregating, on a configured symbol of the sweeping beam, power of an idle resource block RB to a to-be-occupied RB.

In this embodiment of this application, the power of the idle RB is aggregated to the to-be-occupied RB on the symbol of the sweeping beam, so that the sweeping beam can cover the wider area with the same coverage distance. In this case, the configured quantity of sweeping beams in the sweeping periodicity is less than the original quantity, and the original coverage can also be achieved. Therefore, the configured quantity of sweeping beams may be reduced, and the symbol that is not currently used for beam sweeping may be shut down, so that beam sweeping is performed by using the fewer symbols, the quantity of shutdown symbols is increased, and the quantity of transmit symbols is reduced. This resolves the technical problem in the conventional technology that the plurality of symbols are always in the power consumption state and the energy overheads are high because the fixed quantity of beams are used for sweeping to enhance coverage, so that the base station saves more energy.

According to a fourth aspect, an embodiment of this application provides a communication apparatus, applied to beam sweeping. The apparatus includes: an obtaining unit, configured to obtain system load of a cell at a current moment; a first configuration unit, configured to configure a quantity of sweeping beams in a sweeping periodicity based on the system load at the current moment; and a second configuration unit, configured to configure a quantity of shutdown symbols based on the quantity of sweeping beams.

In a possible implementation, the apparatus further includes: a power aggregation unit, configured to aggregate, on a configured symbol of the sweeping beam, power of an idle resource block RB to a to-be-occupied RB.

In a possible implementation, a lower current load level indicates a smaller configured quantity of sweeping beams in the periodicity, the current load level is a load level of the system load at the current moment, and system load at a low load level is less than system load at a high load level.

In a possible implementation, the first configuration unit includes: an estimation unit, configured to estimate available power for beam sweeping based on the system load at the current moment; and a beam configuration unit, configured to configure the quantity of sweeping beams in the sweeping periodicity and a beam width of each sweeping beam based on the available power.

In a possible implementation, the available power for beam sweeping includes power of the to-be-occupied RB obtained after the power of the idle RB is aggregated to the to-be-occupied RB.

In a possible implementation, the first configuration unit is further configured to configure a beam width of each sweeping beam based on the quantity of sweeping beams.

In a possible implementation, the first configuration unit further includes: a resource element determining unit, configured to determine, based on the quantity of sweeping beams, one or more resource elements REs corresponding to each sweeping beam, where a width of the sweeping beam is superposed by beams corresponding to the one or more corresponding REs.

In a possible implementation, the first configuration unit further includes: a latency step adjustment unit, configured to adjust a latency step based on a scheduling bandwidth; a weight value configuration unit, configured to obtain, based on the latency step, precoding matrix weight values of the REs corresponding to the sweeping beam; and a weighted traversal unit, configured to perform, based on the precoding matrix weight values, weighted traversal on the REs corresponding to the sweeping beam.

In a possible implementation, the apparatus further includes: a beam direction control unit, configured to control a beam direction of the sweeping beam based on a position of a terminal device in the cell.

In a possible implementation, the configured beam direction of the sweeping beam is staggered with a beam direction of a neighboring cell of the cell.

In a possible implementation, the apparatus further includes: a symbol staggering unit, configured to: if a shutdown sweeping symbol is configured in the sweeping periodicity, stagger a time domain symbol of a transmit beam with a time domain symbol of a transmit beam of the neighboring cell of the cell.

According to a fifth aspect, an embodiment of this application provides a communication apparatus. The apparatus includes: a beam direction control unit, configured to: control a beam direction of a sweeping beam based on a position of a terminal device in a cell, and determine a quantity of sweeping beams; and a resource element determining unit, configured to determine, based on the quantity of sweeping beams, one or more resource elements REs corresponding to each sweeping beam, where a width of the sweeping beam is superposed by beams corresponding to the one or more corresponding REs.

In a possible implementation, the apparatus may further include: a latency step adjustment unit, configured to adjust a latency step based on a scheduling bandwidth; a weight value configuration unit, configured to obtain, based on the latency step, precoding matrix weight values of the REs corresponding to the sweeping beam; and a weighted traversal unit, configured to perform, based on the precoding matrix weight values, weighted traversal on the REs corresponding to the sweeping beam.

In a possible implementation, the apparatus may further include: a power aggregation unit, configured to aggregate, on a configured symbol of the sweeping beam, power of an idle resource block RB to a to-be-occupied RB.

In a possible implementation, when current system load is at a first load level, the beam direction control unit controls the beam direction of the sweeping beam based on the position of the terminal device in the cell, and determines the quantity of sweeping beams.

Alternatively, when current system load is at a second load level and a proportion of the terminal device located in a first geographic area reaches a threshold, the beam direction control unit controls the beam direction of the sweeping beam based on the position of the terminal device in the cell, and determines the quantity of sweeping beams.

In a possible implementation, the configured beam direction is staggered with a beam direction of a neighboring cell of the cell.

In a possible implementation, the apparatus may further include: a symbol staggering unit, configured to: if a shutdown sweeping symbol is configured in a periodicity of a transmit beam, stagger a time domain symbol of the transmit beam with a time domain symbol of a transmit beam of the neighboring cell of the cell.

According to a sixth aspect, an embodiment of this application provides a communication apparatus. The apparatus includes: a symbol shutdown configuration unit, configured to configure a shutdown sweeping symbol in a periodicity of a transmit beam; and a symbol staggering unit, configured to: in a process of configuring a sweeping beam, stagger a time domain symbol of the transmit beam with a time domain symbol of a transmit beam of a neighboring cell of a current cell.

In a possible implementation, the apparatus may further include: a power aggregation unit, configured to aggregate, on a configured symbol of the sweeping beam, power of an idle resource block RB to a to-be-occupied RB.

According to a seventh aspect, an embodiment of this application provides a communication device, including a processor and a memory. The memory is configured to store a program. The processor is configured to execute the program stored in the memory. When the program is executed, the processor is configured to perform the method provided in any one of the first aspect or the implementations of the first aspect, any one of the second aspect or the implementations of the second aspect, or any one of the third aspect or the implementations of the third aspect in embodiments of this application.

According to an eighth aspect, an embodiment of this application provides a computer-readable storage medium. The computer-readable storage medium stores instructions. When the instructions are run on a computer, the computer is enabled to perform the method provided in any one of the first aspect or the implementations of the first aspect, any one of the second aspect or the implementations of the second aspect, or any one of the third aspect or the implementations of the third aspect.

According to a ninth aspect, an embodiment of this application provides a computer program product. When the computer program product runs on a computer, the computer is enabled to perform the method provided in any one of the first aspect or the implementations of the first aspect, any one of the second aspect or the implementations of the second aspect, or any one of the third aspect or the implementations of the third aspect.

It may be understood that the communication apparatuses provided in the fourth aspect and the fifth aspect, the communication device provided in the sixth aspect, the computer-readable storage medium provided in the seventh aspect, and the computer program product provided in the eighth aspect are all configured to perform the method provided in any one of the first aspect or the implementations of the first aspect, any one of the second aspect or the implementations of the second aspect, or any one of the third aspect or the implementations of the third aspect. Therefore, for beneficial effects that can be achieved, refer to beneficial effects in the communication method provided in the first aspect, the second aspect, or the third aspect. Details are not described herein again.

BRIEF DESCRIPTION OF THE DRAWINGS

The following describes the accompanying drawings used in embodiments of this application.

DETAILED DESCRIPTION OF ILLUSTRATIVE EMBODIMENTS

Figure 1:
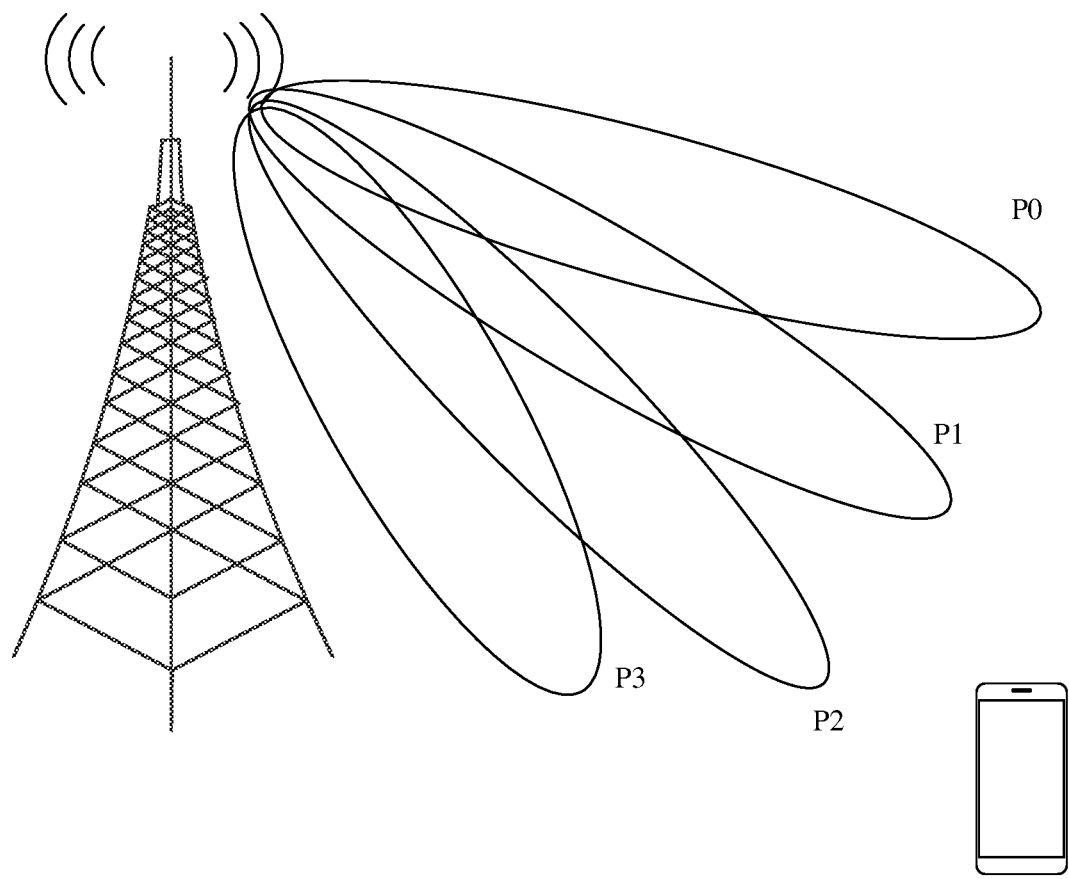
FIG. 1 is a schematic architectural diagram of a communication system according to an embodiment of this application.

The following clearly describes the technical solutions in embodiments of this application with reference to the accompanying drawings in embodiments of this application.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to embodiments may be included in at least one embodiment of this application. The phrase shown in various positions in the specification may not necessarily refer to a same embodiment, and is not an independent or optional embodiment exclusive from another embodiment. It is explicitly and implicitly understood by a person skilled in the art that embodiments described in the specification may be combined with another embodiment.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may perform communication by using a local and/or remote process and according to, for example, a signal having one or more data packets (for example, data from two components interacting with another component in a local system, a distributed system, and/or across a network such as the Internet interacting with other systems by using the signal).

An interface device operating in a wireless environment in embodiments of this application may include but is not limited to a base station in a general form, a high frequency station, a low frequency station, a macro station, a small cell, a repeater, a relay station, base stations in various forms or a part of a base station, and base station units in various forms in a cloud radio access network (CRAN).

The base station in embodiments of this application may alternatively be a radio access network (RAN) node of a wireless network, for example, may be a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a base band unit (BBU), or a wireless fidelity (Wi-Fi) access point (AP). In a network structure, the base station may be a central unit (CU) node, a distributed unit (DU) node, or a RAN device including a CU node and a DU node.

A terminal device in embodiments of this application may also be referred to as user equipment (UE), a mobile station (MS), a mobile terminal (MT), or the like, and is a device that provides a user with voice and/or data connectivity, for example, a handheld device or a vehicle-mounted device having a wireless connection function. For example, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or a vehicle having a driving domain controller.

The following first describes, with reference to FIG. 1, a schematic architectural diagram of a communication system according to an embodiment of this application, to describe, by using an example, a wireless communication scenario to which a communication method in this application is applied. The communication method in embodiments of this application is applicable to any system to which multi-antenna is applied and any communication system to which beam sweeping is applied, for example, a 3G/4G/5G communication system and a next-generation communication system. The communication system includes but is not limited to a universal mobile communications system (UMTS) in 3G, a 4G (4th generation mobile communication system) evolved system, such as an LTE (long term evolution) system, a 5G (5th generation mobile communication system) system, and a communication network such as a CRAN (cloud radio access network). A scenario in which different systems/standards coexist may also fall within an applicable scope of this application.

Figure 2:
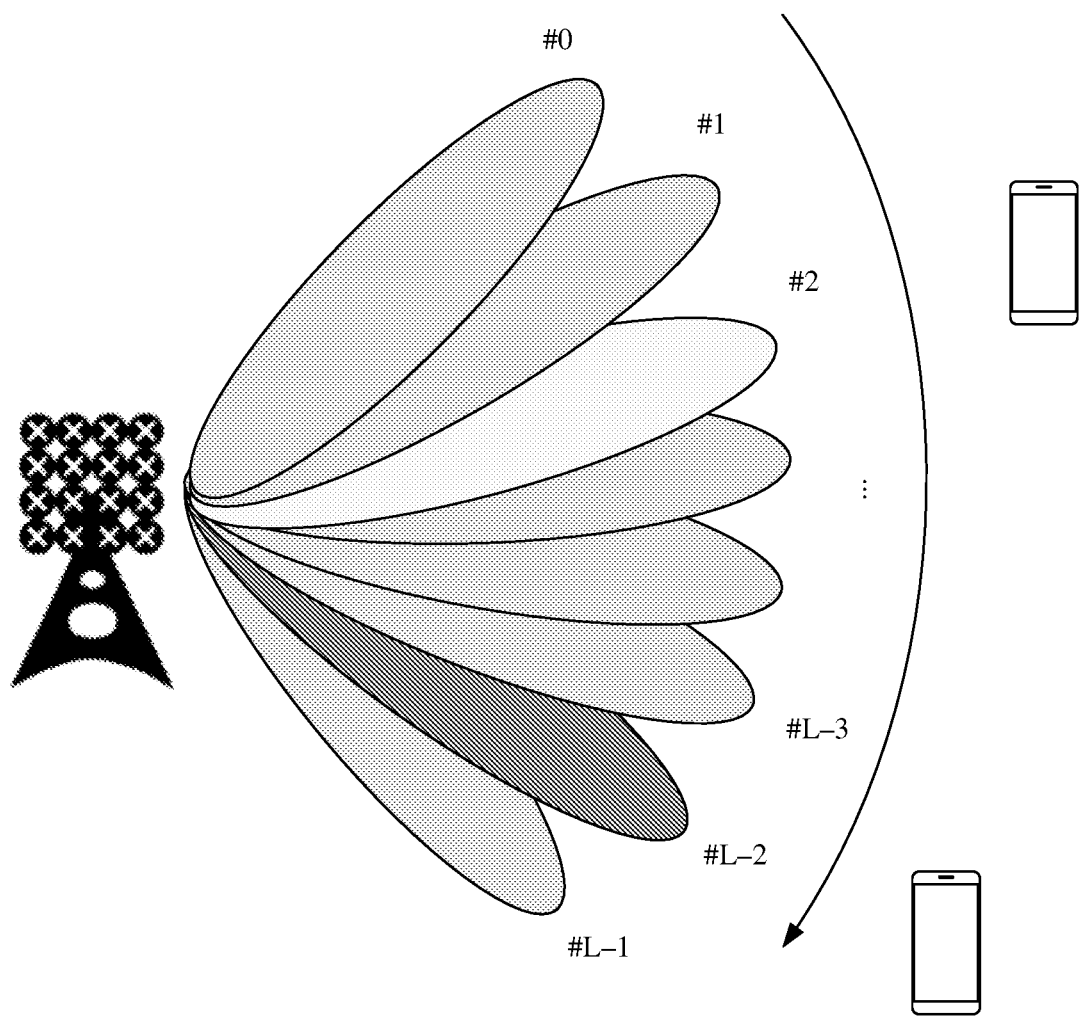
FIG. 2 is a schematic architectural diagram of a communication system according to another embodiment of this application.

In FIG. 1, a transceiver system including a base station and a terminal device (a mobile intelligent terminal) is specifically used as an example, and collaboration is performed between base stations based on the transceiver system including the base station and the terminal device. FIG. 2 is a schematic architectural diagram of a communication system according to another embodiment of this application. A transceiver system including a base station and a terminal device specifically includes information exchange between the base station to which a multi-antenna technology is applied and the terminal device. Specifically, for example, after a beamforming technology is used, the base station needs to use a plurality of beams with different directions to fully cover a cell. As shown in FIG. 2, the base station uses eight beams to cover the cell served by the base station. In a downlink process, the base station sequentially transmits radio signals by using beams with different directions. This process is referred to as beam sweeping. In addition, the terminal device measures the radio signals transmitted by using the different beams (Beam measurement), and reports related information (Beam reporting) to the base station. The base station determines, based on a report of the terminal device, an optimal transmit beam (Beam determination) aimed at the terminal device.

Figure 3A:
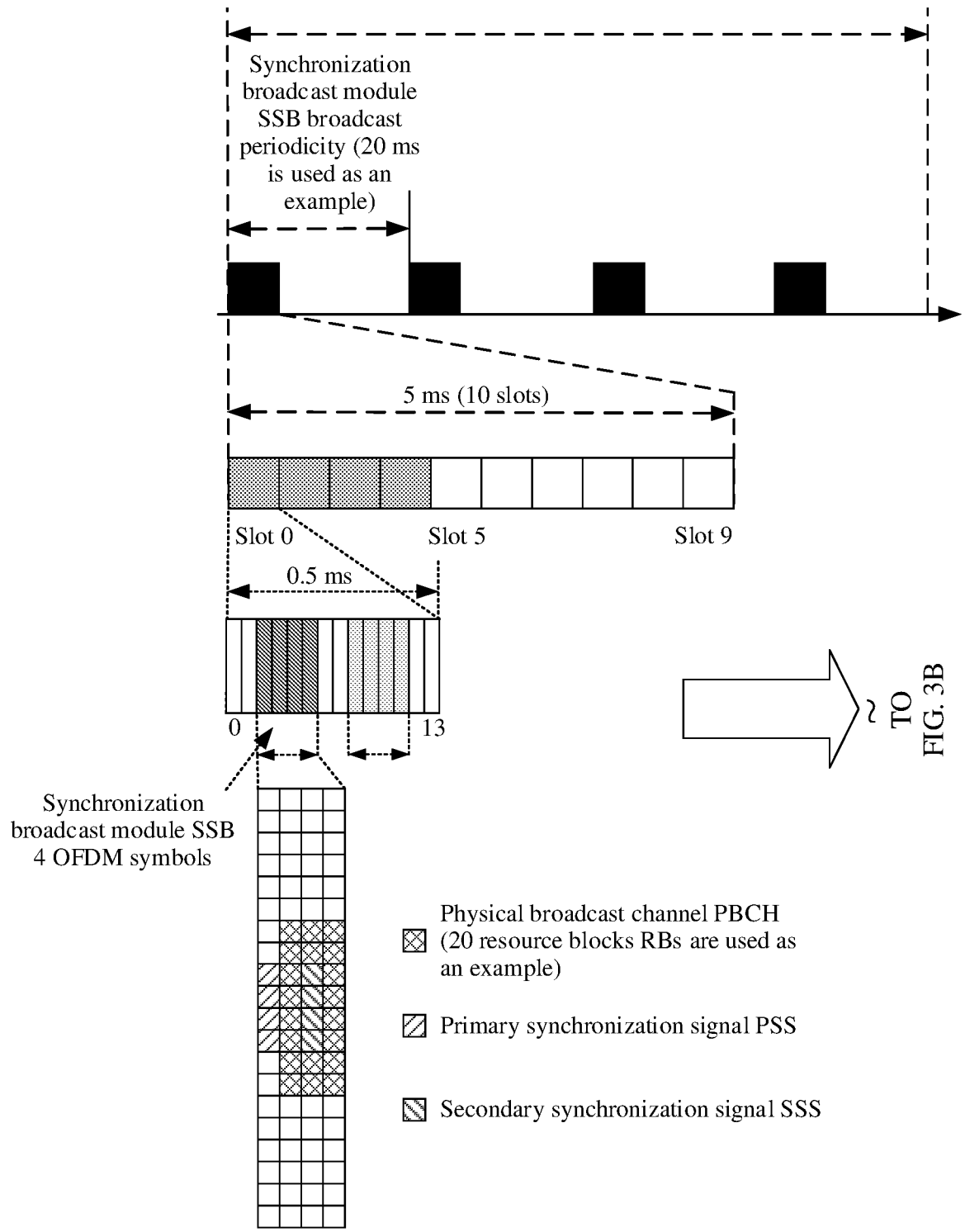
FIG. 3A and FIG. 3B are a schematic diagram of a beam sweeping principle according to an embodiment of this application.
Figure 3B:
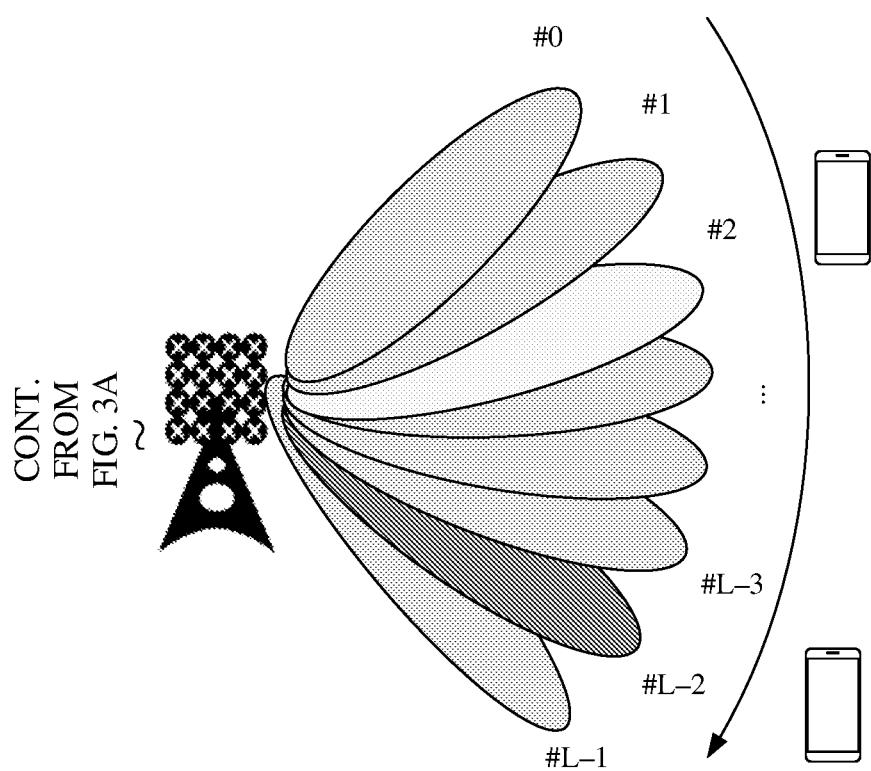

For example, for a synchronization broadcast module (SS (Synchronization Signal)/PBCH (Physical broadcast channel) Block, SSB), current SSB sweeping performs beam sending in turn at different time. As shown in FIG. 3A and FIG. 3B, assuming that there are eight beams and a periodicity of beam sweeping is 20 ms, in the first four slots of the first 5 ms in the 20 ms, the system uses the eight beams for sweeping in turn once in terms of time, beam sweeping occurs twice in each slot, and beam sweeping is performed for a total of eight times in the four slots. Each beam occupies four orthogonal frequency division multiplexing (OFDM) symbols, and the eight beams require 8×4 OFDM symbols in time domain.

In a conventional technology, regardless of system load and power, for the system in which the eight beams are used for sweeping, on 8×4, that is, 32 OFDM symbols in the sweeping periodicity of 20 ms, these symbols are always in a power-on state, and system energy overheads are high. According to the communication method in embodiments of this application, a technical problem of high energy consumption of the base station in the conventional technology can be resolved, so that the base station saves more energy.

It should be noted that the communication method in embodiments of this application may be specifically applied to scenarios such as downlink broadcast, synchronization, and data sending, and uplink access and data sending. A downlink broadcast and synchronization process may include downlink synchronization and broadcast in which SSB sweeping is used, but the downlink synchronization and broadcast in which SSB sweeping is used is also applicable to a synchronization process in LTE, and may also include a common control channel (Common Physical Downlink Control Channel, Common PDCCH) sending process in which a plurality of beams are used for sweeping. The uplink access and data sending may include an uplink initial access process. For example, for a simplified random access system and access-free data sending, the communication method in embodiments of this application is applicable to a scenario in which data is carried and sent in the first step of random access. The base station in this embodiment of this application may always send an energy-saving super beam at a specific periodicity, to achieve full coverage. The terminal device can implement two-step access, access-free data sending, and random access preamble for carrying and sending data anytime and anywhere.

Figure 4:
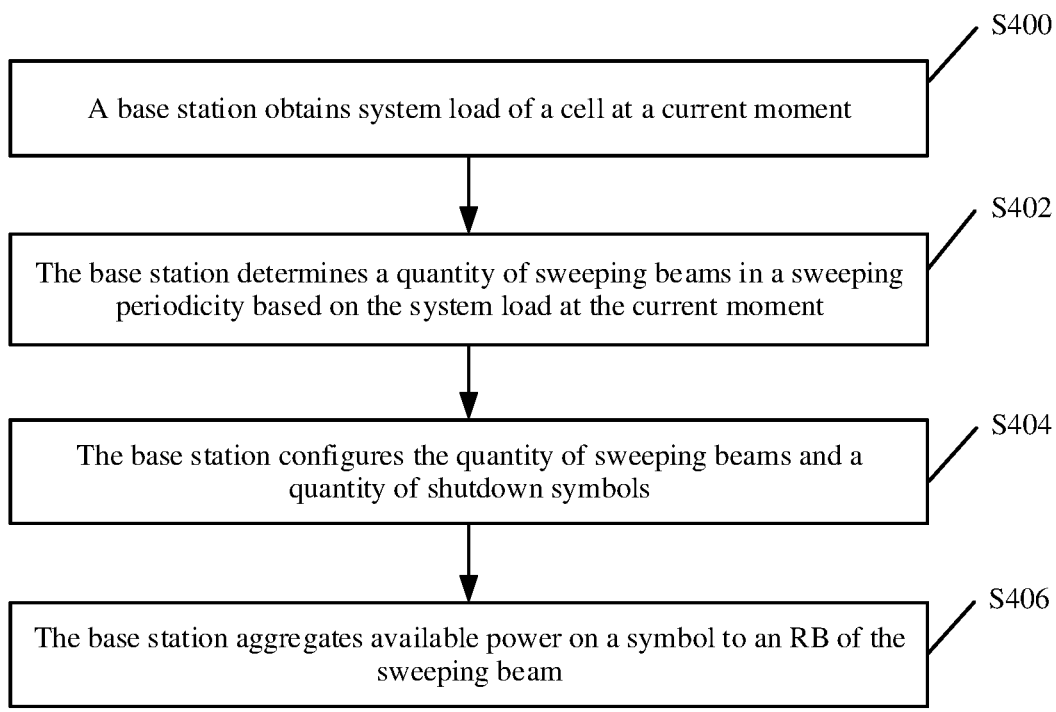
FIG. 4 is a schematic flowchart of a communication method according to an embodiment of this application.

FIG. 4 is a schematic flowchart of a communication method according to an embodiment of this application. An example in which a base station performs SSB sweeping is used below to describe how the base station interacts with a terminal device. The following steps may be included.

Step S400: The base station obtains system load of a cell at a current moment.

Specifically, a system in this embodiment of this application may be a base station. In this case, obtaining the system load at the current moment is determining load of the base station. The base station may directly collect statistics about the system load at the current moment, to obtain the system load at the current moment; or may predict the system load of the current cell at the current moment based on historical system load of the base station, to obtain the system load at the current moment with higher efficiency. For example, the base station may predict the system load at the current moment by collecting statistics about the historical system load, to obtain a distribution rule of the system load in a time periodicity. Alternatively, the base station predicts the system load at the current moment based on distribution of the system load in a preset previous time period. The system load at the current moment is predicted, that is, the system load at the current moment is obtained.

For example, a system load prediction model may be pre-established on a base station side, then the system load prediction model is trained by using a collected sample in a machine learning manner, and a historical sample is input to predict system load. A machine learning algorithm may be used to directly perform prediction based on distribution of system load in a previous time period, or perform prediction based on a distribution rule of historical system load, obtained through statistics and analysis, in a time periodicity. In this case, the base station may input currently recorded historical system load based on the trained system load prediction model, to obtain the predicted system load at the current moment, that is, obtain the system load at the current moment.

Step S402: The base station determines a quantity of sweeping beams in a sweeping periodicity based on the system load at the current moment.

In a possible implementation, a plurality of load levels may be set to correspond to configured quantities of sweeping beams, and different load levels may correspond to different configured quantities of sweeping beams. A lower current load level indicates a smaller configured quantity of sweeping beams in the periodicity. The current load level is a load level of the system load at the current moment, and system load at a low load level is less than system load at a high load level.

For example, a correspondence shown in Table 1 is as follows:

TABLE 1

| System load at a current moment | Load level | Quantity of sweeping beams |
|---|---|---|
| [0%, 10%] | Level 1 | 1 |
| (10%, 30%] | Level 2 | 2 |
| (30%, 50%] | Level 3 | 4 |
| ... | ... | ... |

The load level 1 in Table 1 is a highest level, and the system load at the current moment corresponding to the load level 1 is 0 to 10%, where (* indicates that a value range does not include a value corresponding to *, and [* or *] indicates that a value range includes a value corresponding to *. Load levels are sorted in descending order. A plurality of load levels are set to correspond to determined quantities of sweeping beams, and different load levels may correspond to different quantities of sweeping beams, so that sweeping beam adjustment can be quickly completed. This resolves a technical problem in a conventional technology that a plurality of symbols are always in a power consumption state and energy overheads are high because a fixed quantity of beams are used for sweeping to enhance coverage, so that the base station saves more energy.

In a possible implementation, step S402 in which the base station determines a quantity of sweeping beams in a sweeping periodicity based on the system load at the current moment may specifically include: The base station estimates available power for beam sweeping based on a quantity of to-be-occupied RBs; and then the base station determines the quantity of sweeping beams based on the available power.

Specifically, the base station may estimate a quantity of idle RBs on a common channel based on the system load at the current moment. In an embodiment, power originally allocated to the quantity of idle RBs may be aggregated to an RB occupied by the common channel.

For example, the system has no other RB overheads except for the common channel such as an SSB. In this case, system load is 1%. For a system bandwidth (or a scheduling bandwidth) of 20 M, a total of 106 RBs are available. In this case, the SSB needs to occupy 20 RBs. That is, power of remaining 86 RBs may be aggregated to the SSB of 20 RBs. If the system evenly allocates power based on a quantity of RBs, power of the SSB may reach about five times original power and may be increased by about four times, that is, increased by about 6 dB.

In this case, the available power for beam sweeping may be estimated based on the quantity of to-be-occupied RBs. The available power in this embodiment of this application may be power of the to-be-occupied RB obtained after the power of the idle resource block RB is aggregated to the to-be-occupied RB. In the foregoing example, the available power is total power obtained after the power of the to-be-occupied RBs (the RBs to be consumed by the common channel such as the SSB) is increased by 6 dB.

For another example, in addition to the common channel such as an SSB, a data symbol in the system further needs to occupy a part of RBs (for example, about 10% RBs). In this case, system load is 10%. For a system bandwidth (or a scheduling bandwidth) of 20 M, a total of 106 RBs are available. In this case, the SSB needs to occupy 20 RBs, and data needs to occupy about 10 RBs. That is, power of remaining about 76 RBs may be aggregated to the SSB of 20 RBs (the RBs to be consumed by the common channel such as the SSB). In this way, power of the SSB may reach about four times original power, that is, may be increased by about 5 dB. In other words, the available power is total power obtained after the power of the to-be-occupied RBs (the RBs to be consumed by the common channel such as the SSB) is increased by 5 dB.

It should be noted that, in this embodiment of this application, the power of the idle resource block RB is aggregated to the to-be-occupied RB. Specifically, as described in the foregoing example, the power of the idle RB may be aggregated only to the RB to be occupied by the common channel such as the SSB. Alternatively, the power of the idle RB may be aggregated to all to-be-occupied RBs. To be specific, if an example in which the SSB needs to occupy 20 RBs and the data needs to occupy about 10 RBs is used, the power of the remaining about 76 RBs may be aggregated to 30 RBs (the RBs to be consumed by the common channel such as the SSB plus the RBs to be occupied by the data).

More array elements that generate a beam indicates that the beam is more aggregated and a gain is higher. However, a coverage beam width is decreased. Therefore, a plurality of times of sweeping are required to achieve the coverage beam width, and in addition, a quantity of occupied symbols is increased accordingly. In this case, if the available power, that is, aggregated power is large, fewer super beams may be designed. If the available power is limited, a quantity of super beams may be increased accordingly.

SSB sweeping of eight beams is used as an example. For the system load of 10%, if it is estimated that power may be increased by 6 dBm, one wide beam or two beams may be configured to achieve coverage of the original eight beams. For heavier load, increased power is decreased accordingly. Two or four beams may be designed to achieve the coverage of the eight beams through power aggregation.

In a possible implementation, a plurality of power levels may be set to correspond to configured quantities of sweeping beams, and different power levels may correspond to different configured quantities of sweeping beams. A higher current power level indicates a smaller configured quantity of sweeping beams. The current power level is a power level of the available power, and available power at a high power level is greater than available power at a low power level.

For example, a correspondence shown in Table 2 is as follows:

TABLE 2

| Available power | Power level | Quantity of sweeping beams |
|---|---|---|
| Greater than 9 dBm | Level 1 | 1 |
| (6 dBm, 9 dBm] | Level 2 | 2 |
| (3 dBm, 6 dBm] | Level 3 | 4 |
| ... | ... | ... |

The power level 1 in Table 2 is a highest level. Load levels are sorted in descending order. A plurality of power levels are set to correspond to configured quantities of sweeping beams, and different power levels may correspond to different configured quantities of sweeping beams, so that sweeping beam adjustment can be quickly completed. This resolves the technical problem in the conventional technology that the plurality of symbols are always in the power consumption state and the energy overheads are high because the fixed quantity of beams are used for sweeping to enhance coverage, so that the base station saves more energy.

Step S404: The base station configures the quantity of sweeping beams and a quantity of shutdown symbols.

Specifically, the sweeping beam is configured based on the quantity of sweeping beams determined in step S402. The quantity of shutdown symbols is configured based on the quantity of sweeping beams.

The system (for example, the base station) may define or set a default quantity of sweeping beams based on a quantity of antennas. In this case, when the quantity of shutdown symbols is configured based on the quantity of sweeping beams, the quantity of shutdown symbols may be specifically configured based on the quantity of sweeping beams and the predefined or preset quantity of sweeping beams. The shutdown symbol in this embodiment of this application may be specifically a symbol that is shut down and that is an originally defined or default OFDM symbol used for beam sweeping, and the shutdown symbol is no longer used for beam sweeping. For example, eight sweeping beams are predefined, each beam occupies four OFDM symbols, and the quantity of sweeping beams determined in step S404 is 2. In this case, the quantity of shutdown symbols may be configured, and may be determined according to the following formula $G=4y-4q$. $G$ is the configured quantity of shutdown symbols, $y$ is the quantity of sweeping beams predefined by the system, and $q$ is the quantity of sweeping beams determined in step S402.

In other words, if the configured quantity of sweeping beams is less than an original quantity, a super beam is configured. For example, if two sweeping beams are configured currently, which is less than the original eight sweeping beams. Therefore, symbol shutdown can be configured for symbols that are originally used for SSB sweeping but is not currently used for beam scanning. That is, 24 shutdown symbols are configured.

Figure 5:
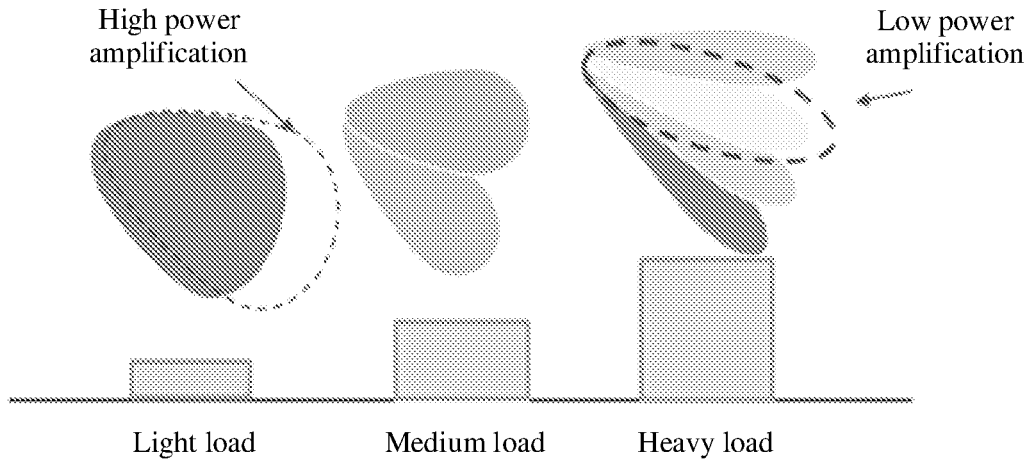
FIG. 5 is a schematic diagram of a beam quantity configuration principle according to an embodiment of this application.

The following uses an example for description with reference to FIG. 5 that is a schematic diagram of a beam quantity configuration principle according to an embodiment of this application. When system load is light, one sweeping beam (with high power amplification) may be configured. When system load is medium, two sweeping beams may be configured. When system load is heavy, four sweeping beams (with low power amplification) may be configured. Coverage of one sweeping beam on the leftmost side is the same as coverage of two sweeping beams in the middle and is the same as coverage of four sweeping beams on the rightmost side. The sweeping beam on the leftmost side is aggregated to obtain maximum power. When the sweeping beam on the leftmost side is configured, there is a largest quantity of shutdown symbols. That is, a quantity of transmit symbols is reduced, and optimal transmit power is designed to increase the quantity of shutdown symbols.

In a possible implementation, after configuring the quantity of sweeping beams in step S404, the base station may further configure a beam width of each sweeping beam based on the quantity of sweeping beams. For example, two sweeping beams are configured in step S404. When coverage of the original eight sweeping beams needs to be achieved by using the two sweeping beams, beam widths of the two sweeping beams are configured to achieve the coverage of the original eight sweeping beams. For another example, when two sweeping beams are configured in step S404, and coverage of only two of the original eight sweeping beams needs to be covered, it is equivalent to describing that beam widths of the two sweeping beams configured in this application are configured as beam widths of the original sweeping beams, that is, a beam width configuration remains unchanged.

Step S406: The base station aggregates available power on a symbol to an RB of the sweeping beam.

Specifically, the base station may perform, on a symbol (for example, on an OFDM symbol) of the super beam, power aggregation on the idle RB other than the to-be-occupied RB, and aggregate the power to the to-be-occupied RB. Therefore, a current sweeping beam can achieve predetermined coverage. The available power on the symbol is aggregated in this embodiment of this application, "on the symbol" may be specifically on a symbol included in each slot in FIG. 3A and FIG. 3B. For example, a slot 0 includes two different symbols on the left and right sides, and each symbol corresponds to one sweeping beam. Each symbol may specifically include four OFDM symbols.

A left-side symbol of the slot 0 in FIG. 3A and FIG. 3B is used as an example. If the system has no other RB overheads except for the common channel such as the SSB, a blank RB on the left symbol is a remaining or idle RB. It is assumed that a total of 80 RBs are available in the figure, and the common channel such as the SSB needs to occupy 28 RBs. That is, power of remaining 52 RBs may be aggregated to the common channel such as the SSB of 20 RBs.

In this embodiment of this application, the quantity of sweeping beams is configured based on the system load at the current moment, and the system load at the current moment is directly associated with a quantity of RBs used by the system at the current moment. In this case, the available power for beam sweeping may be estimated based on the system load at the current moment. Lighter system load at the current moment indicates greater available power. In other words, power of more idle RBs may be aggregated to an RB of the sweeping beam, to avoid a case in which the base station directly allocates power evenly based on a quantity of RBs in the conventional technology. If some RBs are idle, corresponding power allocated to the RBs is wasted. After a power aggregation policy is applied, the power of the idle resource block RB is aggregated to the to-be-occupied RB on the symbol of the sweeping beam, so that the sweeping beam can cover the wider area with the same coverage distance. In other words, when the system load at the current moment is light, the quantity of sweeping beams in the sweeping periodicity is configured to be less than an original quantity, and original coverage can also be achieved. The configured quantity of sweeping beams is reduced, and a symbol that is not currently used for beam sweeping may be shut down, so that beam sweeping is performed by using fewer symbols, a quantity of shutdown symbols is increased, and a quantity of transmit symbols is reduced. This resolves the technical problem in the conventional technology that the plurality of symbols are always in the power consumption state and the energy overheads are high because the fixed quantity of beams are used for sweeping to enhance coverage, so that the base station saves more energy.

For example, FIG. 3A and FIG. 3B are used as an example. If the system predefines or sets, by default, eight sweeping beams in each periodicity, it is determined, based on current system load, that only two sweeping beams are required, and 24 shutdown symbols are configured, in the first four slots in the first 5 ms of the original periodicity, only one slot is required for beam sweeping, and other slots may be used to transmit other data.

In a possible implementation, before step S406, the foregoing embodiments may further include a step of configuring a beam direction of the sweeping beam. A process of configuring the beam direction of the sweeping beam may specifically include:

The base station controls the beam direction of the sweeping beam based on a position of the terminal device in the cell.

The base station learns of or obtains the position of the terminal device in the cell, for example, based on statistics about historical user data, long-term analysis or perception of a rule of user data, or terrain position statistics. The position of the terminal device may be positions of all terminal devices in the cell. Then, a fixed position which a beam faces may be determined based on the position of the terminal device, and the beam direction of the sweeping beam is controlled by configuring a phase difference between channels or selecting one or more beams from basic beams. The basic beams may be a maximum quantity of beams originally preset in the system. As shown in FIG. 2, the maximum quantity of beams originally preset is eight beams. In this case, a beam (for example, a beam numbered #2) in a direction may be selected based on the position of the terminal device, or a plurality of beams (for example, beams numbered #L-3, #L-2, and #L-1) in a direction may be selected based on the position of the terminal device, to control the beam direction of the sweeping beam to the direction of the selected beam.

The historical user data in this embodiment of this application may be specifically position data of all the terminal devices in the cell in a historical time period before the current moment. In this case, the position of the terminal device in the current cell is estimated by collecting statistics about the historical user data.

Because the beam direction of the sweeping beam may be determined based on the position of the terminal device, omnidirectional coverage sweeping is not required, and a narrow beam may be designed, so that the quantity of sweeping beams is further reduced, the quantity of shutdown symbols is further improved, and the quantity of transmit symbols is reduced. This resolves the technical problem in the conventional technology that the plurality of symbols are always in the power consumption state and the energy overheads are high because the fixed quantity of beams are used for sweeping to enhance coverage, so that the base station saves more energy.

In a possible implementation, the configuring a beam width of the sweeping beam based on the quantity of sweeping beams may include: determining, based on the quantity of sweeping beams, one or more resource elements REs corresponding to each sweeping beam, where a width of the sweeping beam is superposed by beams corresponding to the one or more corresponding REs.

Because the beam width of each sweeping beam is obtained by superposing beams corresponding to the REs corresponding to the sweeping beam, the beam width of the sweeping beam may be configured by controlling a phase offset of a beam corresponding to each RE, so that coverage of the sweeping beam can be improved.

This embodiment of this application includes but is not limited to configuring the beam width of the sweeping beam in the following manners:
  adjusting a latency step based on a scheduling bandwidth;
  obtaining, based on the latency step, precoding matrix weight values of the REs corresponding to the sweeping beam; and
  performing, based on the precoding matrix weight values, weighted traversal on the REs corresponding to the sweeping beam.

In this embodiment of this application, after a quantity of REs corresponding to each sweeping beam is determined based on the configured quantity of sweeping beams, the phase offset of the beam corresponding to each RE is determined based on a precoding matrix weight value configured for the RE. The latency step is adjusted based on the scheduling bandwidth, and then the precoding matrix weight values of the REs corresponding to the sweeping beam are obtained based on the latency step, that is, a group of precoding matrix weight values configured for different resource elements REs are obtained, so that an offset between different weight values can be adjusted. For example, a small phase offset of the beam corresponding to each RE is controlled, to achieve wide coverage of the beam in a specific bandwidth, and further improve a coverage angle.

Specifically, this may be implemented by using the following formulas 1:

$$S(k) = W_{PSD}(k) * s(k) = \frac{1}{\sqrt{N_{TRX}}} * \begin{bmatrix} 1 & e^{-j\theta(k)} & \cdots & e^{-j(\theta((N_{TRX}-1)*k)+\varphi)} \end{bmatrix}^T * s(k)$$

$$\theta(k) = 2\pi D \frac{k}{N_{FFT}}, \text{ where } k = 0, 1, \ldots, N_{RE} - 1$$

$$D = \frac{N_{FFT}}{N_{RB} * 12}$$

Formula 1

S(k) is a signal that is weighted by using a precoding matrix, s(k) is a transmitted signal, and $W_{PSD}(k)$ is different precoding matrix weight values traversed on different REs in frequency domain. $N_{TRX}$ is a quantity of antennas. $N_{RE}$ is a quantity of REs, and k is an RE number. φ is a phase.

For example, if $N_{TRX}$ is 8, that is, there are eight antennas, $$S(k) = \frac{1}{\sqrt{8}} * \begin{bmatrix} 1 & e^{-j\theta(k)} & e^{-j\theta(2k)} & e^{-j\theta(3k)} & e^{-j\theta(4k)} & e^{-j\theta(5k)} & e^{-j\theta(6k)} & e^{-j\theta(7k)+\varphi} \end{bmatrix}^T * s(k)$$

$$\theta(k) = 2\pi D \frac{k}{N_{FFT}}, \text{ where } k = 0, 1, \ldots, N_{RE} - 1.$$

It indicates that a latency is added to each antenna, which is equivalent to configuring a different precoding matrix for each RE.

A precoding matrix configured for the first RE is $$\frac{1}{\sqrt{8}} * [1\ 1\ 1\ 1\ 1\ 1\ 1\ 1]^T,$$

and a precoding matrix configured for the second RE is $$\frac{1}{\sqrt{8}} * \begin{bmatrix} 1 & e^{-j2\pi D \frac{1}{N_{FFT}}} & e^{-j2\pi D \frac{2}{N_{FFT}}} & e^{-j2\pi D \frac{3}{N_{FFT}}} & e^{-j2\pi D \frac{4}{N_{FFT}}} & e^{-j2\pi D \frac{5}{N_{FFT}}} & e^{-j2\pi D \frac{6}{N_{FFT}}} & e^{-j2\pi D \frac{7}{N_{FFT}}+\varphi} \end{bmatrix}^T.$$

The rest can be deduced by analogy.

The latency step value D is related to a quantity of RBs ($N_{RE}$) and an FFT specification ($N_{FFT}$). The value D is adjusted based on the scheduling bandwidth to ensure that the value D matches the scheduling bandwidth. A phase in the scheduling bandwidth is rotated for a complete periodicity to avoid a beam coverage hole. Finally, a wide beam in a specific bandwidth can be generated.

Figure 6:
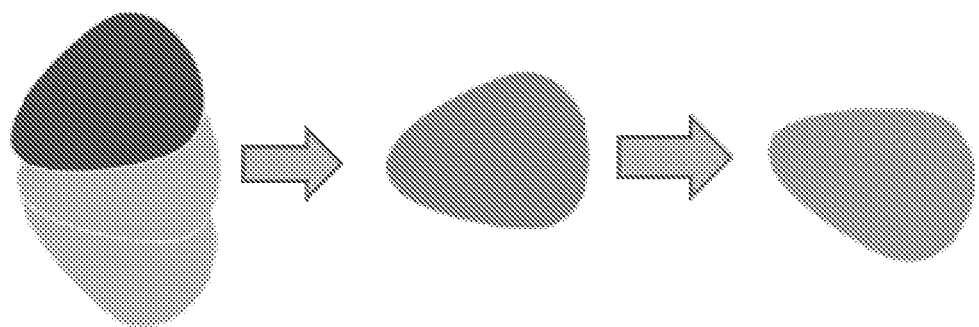
FIG. 6 is a schematic diagram of beam adjustment according to an embodiment of this application.

For example, FIG. 6 is a schematic diagram of beam adjustment according to an embodiment of this application. After the position of the terminal device is learned of, the quantity of sweeping beams may alternatively be reduced, for example, three beams in the figure are reduced to one beam, or beam sweeping may not be required. Then, the beam direction of the sweeping beam is controlled by configuring a phase difference between channels or selecting one or more beams from basic beams, and then a small phase offset of the beam corresponding to each RE may be controlled by adjusting the value D, to further adjust beam coverage.

In a possible implementation, for example, a total quantity of REs is 260. If one sweeping beam is configured, a beam width of the sweeping beam is obtained by superposing beams respectively corresponding to the 260 REs. According to the formula, a different precoding matrix weight value is configured for each RE, each RE corresponds to one narrow beam, and these narrow beams have a small phase offset. Then, each RE is weighted and a wide beam is obtained through superposition. In other words, envelopes of all these narrow beams form one wide beam, to obtain one configured sweeping beam.

If two sweeping beams are configured, corresponding REs are divided into two groups, for example, 130 REs in each group. A value D is calculated for each group of REs, and a different precoding matrix weight value is configured for each RE in each group of REs to form two corresponding second-wide beams; or a value D may be first increased for all REs, and then two independent beams are formed.

In a possible implementation, in the process of configuring the beam width of the sweeping beam in this embodiment of this application, different basic beams may be designed. For example, eight basic beams are preset, including ⅛, ⅖, ⅜, 4/8, ⅝, 6/8, ⅞, and 8/8 beams, and the eight basic beams have different beam widths. In this case, n/8 (where n is less than or equal to 8) beams may be selected to implement full coverage by using fewer beams. Alternatively, a beam with a width of ⅛, ¼, or ½ may be designed by using a basic weight value, and full coverage is formed by flexibly combining these beams, for example, a combination of two ½ beams, or a combination of two ¼ beams and one ½ beam.

In a possible implementation, in the process of configuring the beam direction of the sweeping beam in the foregoing embodiments, the method may further specifically include: The configured beam direction of the sweeping beam is staggered with or different from a beam direction of a neighboring cell of the current cell.

Specifically, when interference between beams of a plurality of cells is considered, a phase difference between channels may be adjusted, or different weight values may be designed, so that a beam difference is formed between the current cell and the neighboring cell of the current cell, to reduce inter-cell interference.

Figure 7:
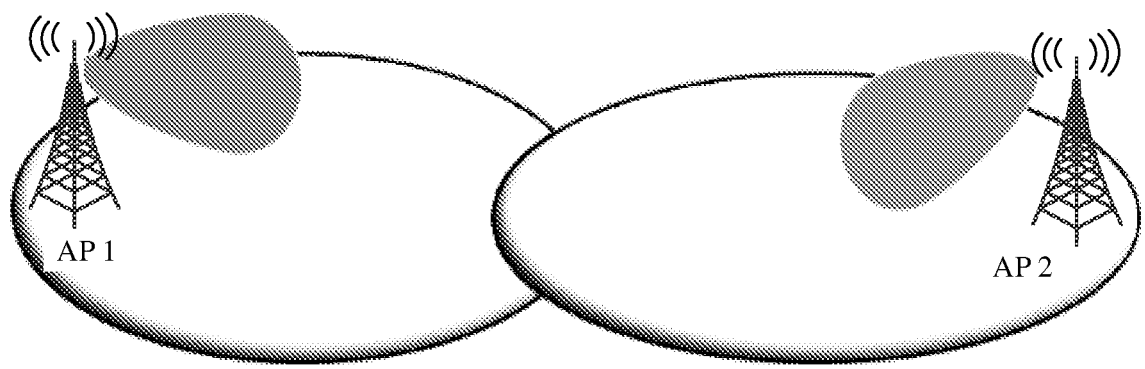
FIG. 7 is a schematic diagram of inter-cell beam direction adjustment according to an embodiment of this application.

For example, FIG. 7 is a schematic diagram of inter-cell beam direction adjustment according to an embodiment of this application. An AP 1 and an AP 2 that are adjacent to each other are used as an example. Each AP performs SSB sweeping in a same slot and symbol. To save a resource and shut down a symbol, a symbol is designed to carry data when the symbol is used to send a common channel, which easily generates mutual interference between cells. Therefore, it is important to control inter-cell interference.

In this embodiment of this application, the beam direction of the neighboring cell of the current cell may be staggered by adjusting the phase difference between channels or designing different weight values, so that a beam difference is formed between the current cell and the neighboring cell, to reduce inter-cell interference. A problem that inter-cell interference is easily generated because to save a resource and shut down a symbol, a symbol is designed to carry data when the symbol is used to send a common channel is avoid.

In another implementation, in the process of configuring the beam direction of the sweeping beam, the method may further specifically include: If a shutdown sweeping symbol is configured in the sweeping periodicity, the base station (that is, in the current cell) staggers or differs a time domain symbol of a transmit beam with or from a time domain symbol of a transmit beam of the neighboring cell of the current cell.

Figure 8:
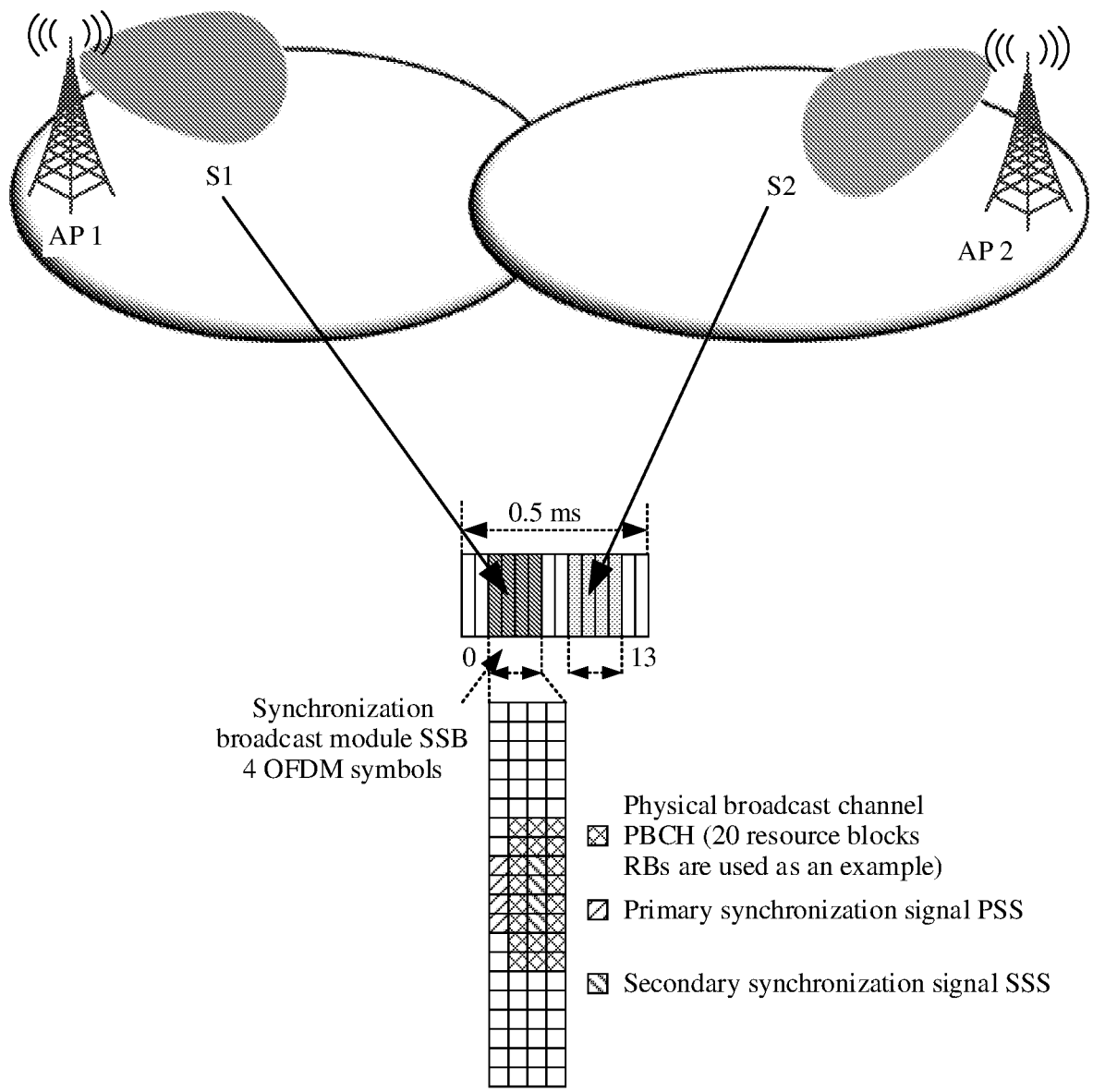
FIG. 8 is a schematic diagram of inter-cell beam direction adjustment according to another embodiment of this application.

Specifically, the beam in this embodiment of this application may be an SSB beam, that is, a synchronization and broadcast beam. FIG. 8 is a schematic diagram of inter-cell beam direction adjustment according to another embodiment of this application. Through a joint design of a plurality of cells, when a quantity of beams is reduced and a shutdown sweeping symbol is configured, it is designed that a time domain symbol of a transmit SSB beam of an AP 1 is S1, and a time domain symbol of a transmit SSB beam of an AP 2 is S2. S1 and S2 are different symbols, that is, slots for sweeping beams of neighboring cells are staggered, to avoid inter-cell interference, so that there is no interference between synchronization and broadcast beams of different cells.

In other words, when the shutdown sweeping symbol is configured in the sweeping periodicity, time domain symbols of beams between the current cell and the neighboring cell of the current cell are staggered, that is, time domain symbols of beams between neighboring cells are different, so that there is no interference between synchronization and broadcast beams of different cells, to further reduce inter-cell interference and improve system efficiency.

In a possible implementation, in the foregoing embodiment, the base station may set to periodically monitor the system load at the current moment or continuously monitoring the system load at the current moment, to configure the quantity of sweeping beams in the sweeping periodicity and the beam direction and the beam width of each sweeping beam. In other words, it may be set that step S400 to step S406 are performed periodically or continuously.

In this case, the system load at the current moment is monitored periodically or continuously, to dynamically configure or adjust the quantity of sweeping beams and dynamically configure the quantity of shutdown symbols, so that sweeping beam adjustment can be more adaptively completed, and energy overheads of the base station can be adjusted in a more timely and balanced manner.

The communication method in this embodiment of this application may be a full-power adaptive spatial-temporal two-dimensional dynamic beam sweeping method. The quantity of sweeping beams in the sweeping periodicity and the beam direction and the beam width of each sweeping beam are dynamically configured based on the system load and the available power. Further, for a specific beam in a specific slot, the beam direction and the beam width are adaptively and dynamically adjusted based on the current load and the available power, so that each beam can face any direction and cover any beam width. In addition, beam sweeping is jointly designed between cells, and coverage directions and transmit symbols of beams between cells are staggered, to reduce inter-cell interference.

Figure 9:
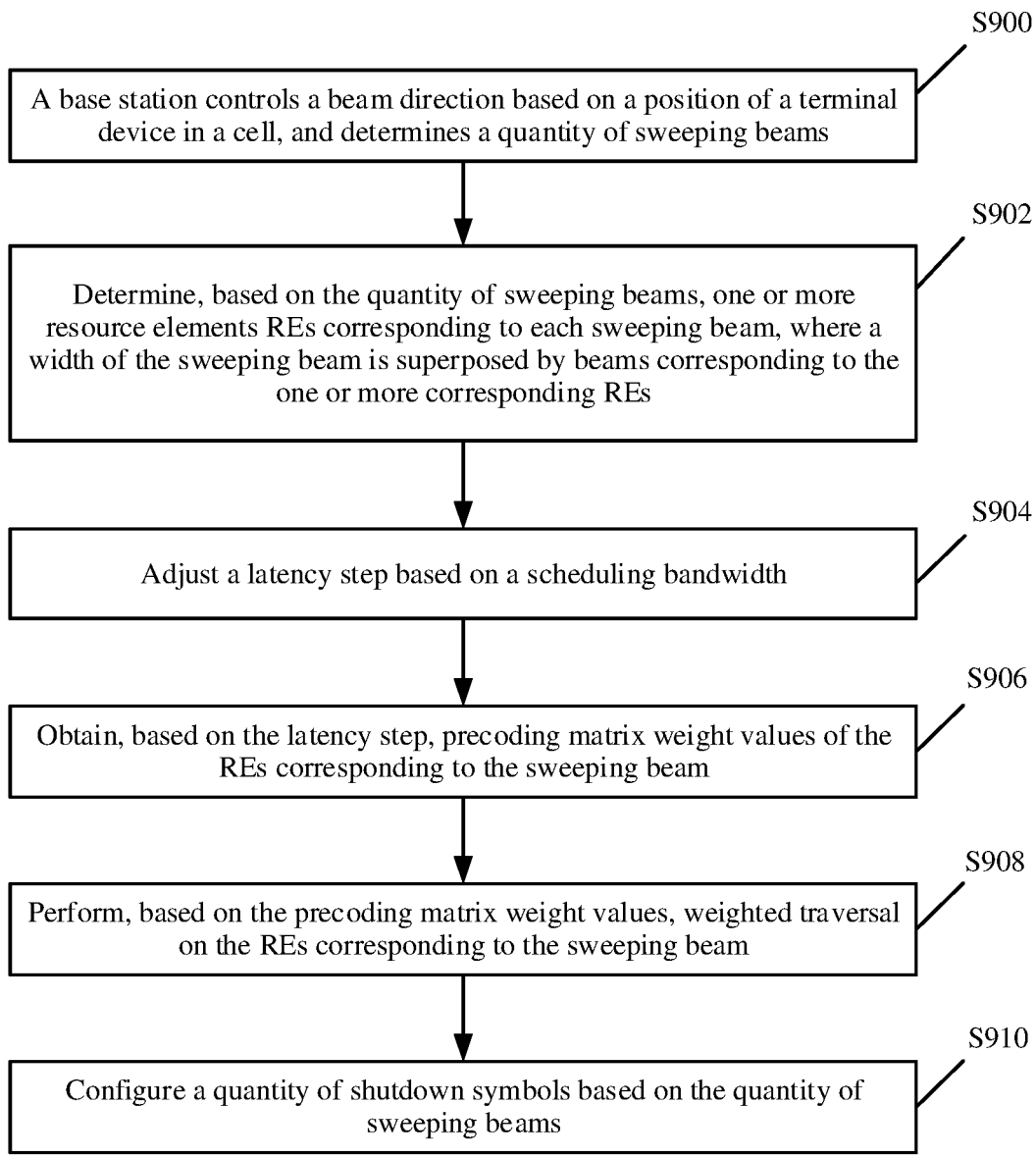
FIG. 9 is a schematic flowchart of a communication method according to another embodiment of this application.

FIG. 9 is a schematic flowchart of a communication method according to another embodiment of this application. An example in which a base station performs SSB sweeping is also used below to describe how the base station interacts with a terminal device. The following steps may be included.

Step S900: The base station controls a beam direction based on a position of the terminal device in a cell, and determines a quantity of sweeping beams.

Specifically, the base station may learn of or obtain the position of the terminal device, for example, based on statistics about historical user data, long-term analysis or perception of a rule of user data, or terrain position statistics. Then, a fixed position which a beam faces may be determined based on the position of the terminal device, and the beam direction of the sweeping beam is controlled by configuring a phase difference between channels or selecting one or more beams from basic beams.

Step S902: Determine, based on the quantity of sweeping beams, one or more resource elements REs corresponding to each sweeping beam, where a width of the sweeping beam is superposed by beams corresponding to the one or more corresponding REs.

Step S904: Adjust a latency step based on a scheduling bandwidth.

Step S906: Obtain, based on the latency step, precoding matrix weight values of the REs corresponding to the sweeping beam.

Step S908: Perform, based on the precoding matrix weight values, weighted traversal on the REs corresponding to the sweeping beam.

In this embodiment of this application, after a quantity of REs corresponding to each sweeping beam is determined based on the configured quantity of sweeping beams, a phase offset of a beam corresponding to each RE is determined based on a precoding matrix weight value configured for the RE. The latency step is adjusted based on the scheduling bandwidth, and then the precoding matrix weight values of the REs corresponding to the sweeping beam are obtained based on the latency step, that is, a group of precoding matrix weight values configured for different resource elements REs are obtained, so that an offset between different weight values can be adjusted. For example, a small phase offset of the beam corresponding to each RE is controlled, to achieve wide coverage of the beam in a specific bandwidth, and further improve a coverage angle.

Specifically, this may be implemented by using the following formulas:

$$S(k) = W_{PSD}(k) * s(k) = \frac{1}{\sqrt{N_{TRX}}} * \begin{bmatrix} 1 & e^{-j\theta(k)} & \ldots & e^{-j(\theta((N_{TRX}-1)*k)+\varphi)} \end{bmatrix}^T * s(k)$$

$$\theta(k) = 2\pi D \frac{k}{N_{FFT}}, \text{ where } k = 0, 1, \ldots, N_{RE} - 1$$

$$D = \frac{N_{FFT}}{N_{RB} * 12}$$

$S(k)$ is a signal that is weighted by using a precoding matrix, $s(k)$ is a transmitted signal, and $W_{PSD}(k)$ is different precoding matrix weight values traversed on different REs in frequency domain. $N_{TRX}$ is a quantity of antennas. $N_{RE}$ is a quantity of REs, and k is an RE number. $\varphi$ is a phase.

The latency step value D is related to a quantity of RBs ($N_{RE}$) and an FFT specification ($N_{FFT}$). The value D is adjusted based on the scheduling bandwidth to ensure that the value D matches the scheduling bandwidth. A phase in the scheduling bandwidth is rotated for a complete periodicity to avoid a beam coverage hole. Finally, a wide beam in a specific bandwidth can be generated.

Specifically, if the quantity of sweeping beams is reduced, step S910 of configuring a quantity of shutdown symbols based on the quantity of sweeping beams may be performed. For details, refer to the descriptions of configuring the quantity of shutdown symbols in step S404 in the embodiment in FIG. 4. Details are not described herein again.

In a possible implementation, the embodiment in FIG. 9 may further include: aggregating, on a configured symbol of the sweeping beam, power of an idle resource block RB to a to-be-occupied RB.

Specifically, in this embodiment of this application, the power of the idle RB is aggregated to the to-be-occupied RB on the symbol of the sweeping beam, so that the sweeping beam can cover a wider area with a same coverage distance. In this case, the configured quantity of sweeping beams in a sweeping periodicity is less than an original quantity, and original coverage can also be achieved. Therefore, the configured quantity of sweeping beams may be further reduced, and a symbol that is not currently used for beam sweeping may be shut down, so that beam sweeping is performed by using fewer symbols, a quantity of shutdown symbols is increased, and a quantity of transmit symbols is reduced. This resolves a technical problem in a conventional technology that a plurality of symbols are always in a power consumption state and energy overheads are high because a fixed quantity of beams are used for sweeping to enhance coverage, so that the base station saves more energy.

In this embodiment of this application, the base station may determine, based on the position of the terminal device, a fixed position which a beam faces, and control the beam direction of the sweeping beam by configuring a phase difference between channels or selecting one or more beams from basic beams. Because the beam direction of the sweeping beam may be determined based on the position of the terminal device, omnidirectional coverage sweeping is not required, a narrow beam is designed, and power may be aggregated to an RB of the sweeping beam. Therefore, beam sweeping can be avoided or the quantity of sweeping beams can be reduced, the quantity of shutdown symbols can be improved, and the quantity of transmit symbols can be reduced. This resolves the technical problem in the conventional technology that the plurality of symbols are always in the power consumption state and the energy overheads are high because the fixed quantity of beams are used for sweeping to enhance coverage, so that the base station saves more energy.

In a possible implementation, step S900 in the foregoing embodiment may be specifically performed when current system load is at a first load level.

Alternatively, step S900 may be specifically performed when current system load is at a second load level and a proportion of the terminal device located in a first geographic area reaches a threshold.

Specifically, the first load level is lower than the second load level. In other words, when the current system load is light and the position of the terminal device is learned of, the beam direction may be controlled by configuring the phase difference between channels or selecting the one or more beams from the basic beams, and beam sweeping may not be required, to reduce the quantity of transmit symbols and increase the quantity of shutdown symbols.

The first geographic area may be set based on an area of a cell covered by the base station. Specifically, a person skilled in the art may set a size of the first geographic area based on an actual requirement or historical data analysis, for example, 50% of the area of the cell covered by the base station. A skilled person may alternatively set the foregoing threshold based on an actual requirement or historical data analysis. For example, the threshold is 100%.

In this embodiment of this application, if the proportion of the terminal device located in the first geographic area reaches the threshold, it indicates that positions of terminal devices are centralized. In this case, even if the current system load is heavy, the beam direction may also be controlled by configuring the phase difference between channels or selecting the one or more beams from the basic beams, and beam sweeping may not be required, to reduce the quantity of transmit symbols and increase the quantity of shutdown symbols.

In a possible implementation, the configured beam direction is staggered with a beam direction of a neighboring cell of the current cell. For details, refer to the descriptions of the embodiments in FIG. 4 and FIG. 7. Details are not described herein again.

In this embodiment of this application, the beam direction of the neighboring cell may be staggered by adjusting the phase difference between channels or designing different weight values, so that a beam difference is formed between the cell and the neighboring cell, to reduce inter-cell interference. A problem that inter-cell interference is easily generated because to save a resource and shut down a symbol, a symbol is designed to carry data when the symbol is used to send a common channel is avoid.

In a possible implementation, if a shutdown sweeping symbol is configured in a periodicity of a transmit beam, a time domain symbol of the transmit beam is staggered with a time domain symbol of a transmit beam of the neighboring cell. For details, refer to the descriptions of the embodiments in FIG. 4 and FIG. 8. Details are not described herein again.

In this embodiment of this application, when the shutdown sweeping symbol is configured in the sweeping periodicity, time domain symbols of beams between neighboring cells are staggered, that is, time domain symbols of beams between neighboring cells are different, so that inter-cell interference can be further reduced, and system efficiency can be improved.

Figure 10:
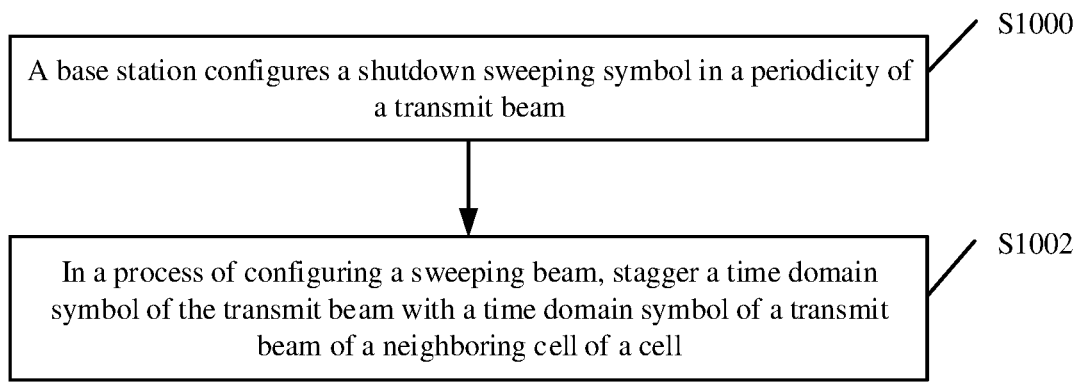
FIG. 10 is a schematic flowchart of a communication method according to another embodiment of this application.

FIG. 10 is a schematic flowchart of a communication method according to another embodiment of this application. An example is used below to describe how a base station interacts with a terminal device. The following steps may be included.

Step S1000: The base station configures a shutdown sweeping symbol in a periodicity of a transmit beam.

Step S1002: In a process of configuring a sweeping beam, stagger a time domain symbol of the transmit beam with a time domain symbol of a transmit beam of a neighboring cell of a cell.

For details about how the base station configures the shutdown sweeping symbol in the periodicity of the transmit beam and how to stagger the time domain symbol of the transmit beam with the time domain symbol of the transmit beam of the neighboring cell of the current cell in the process of configuring the sweeping beam, refer to the descriptions of the embodiments in FIG. 4 and FIG. 8. Details are not described herein again.

In a possible implementation, the embodiment in FIG. 10 may further include:

Specifically, in this embodiment of this application, power of an idle RB is aggregated to a to-be-occupied RB on a symbol of the sweeping beam, so that the sweeping beam can cover a wider area with a same coverage distance. In this case, a configured quantity of sweeping beams in a sweeping periodicity is less than an original quantity, and original coverage can also be achieved. Therefore, the configured quantity of sweeping beams may be further reduced, and a symbol that is not currently used for beam sweeping may be shut down, so that beam sweeping is performed by using fewer symbols, a quantity of shutdown symbols is increased, and a quantity of transmit symbols is reduced. This resolves a technical problem in a conventional technology that a plurality of symbols are always in a power consumption state and energy overheads are high because a fixed quantity of beams are used for sweeping to enhance coverage, so that the base station saves more energy.

In this embodiment of this application, when the shutdown sweeping symbol is configured in the sweeping periodicity, time domain symbols of beams between neighboring cells are staggered, that is, time domain symbols of beams between neighboring cells are different, so that inter-cell interference can be further reduced, and system efficiency can be improved.

Figure 11:
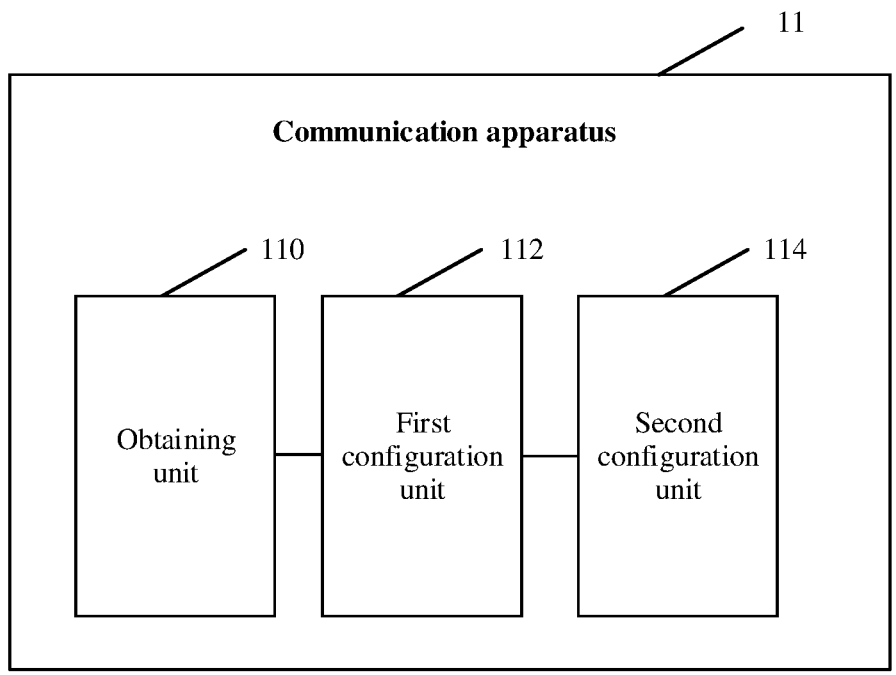
FIG. 11 is a schematic structural diagram of a communication apparatus according to an embodiment of this application.

An embodiment of this application further provides a communication apparatus, applied to beam sweeping. FIG. 11 is a schematic structural diagram of a communication apparatus according to an embodiment of this application. The communication apparatus 11 may include an obtaining unit 110, a first configuration unit 112, and a second configuration unit 114.

The obtaining unit no is configured to obtain system load of a cell at a current moment.

The first configuration unit 112 is configured to configure a quantity of sweeping beams in a sweeping periodicity based on the system load at the current moment.

The second configuration unit 114 is configured to configure a quantity of shutdown symbols based on the quantity of sweeping beams.

In a possible implementation, the communication apparatus 11 may further include: a power aggregation unit, configured to aggregate, on a configured symbol of the sweeping beam, power of an idle resource block RB to a to-be-occupied RB.

In a possible implementation, a lower current load level indicates a smaller configured quantity of sweeping beams in the periodicity, the current load level is a load level of the system load at the current moment, and system load at a low load level is less than system load at a high load level.

In a possible implementation, the first configuration unit 112 may include an estimation unit and a beam configuration unit.

The estimation unit is configured to estimate available power for beam sweeping based on the system load at the current moment.

The beam configuration unit is configured to configure the quantity of sweeping beams in the sweeping periodicity and a beam width of each sweeping beam based on the available power.

In a possible implementation, the available power for beam sweeping includes power of the to-be-occupied RB obtained after the power of the idle RB is aggregated to the to-be-occupied RB.

In a possible implementation, the first configuration unit 112 may be further configured to configure a beam width of each sweeping beam based on the quantity of sweeping beams.

In a possible implementation, the communication apparatus 11 may further include: a beam direction control unit, configured to control a beam direction of the sweeping beam based on a position of a terminal device in the cell.

In a possible implementation, the first configuration unit 112 may further include a resource element determining unit, a latency step adjustment unit, a weight value configuration unit, and a weighted traversal unit.

The resource element determining unit is configured to determine, based on the quantity of sweeping beams, one or more resource elements REs corresponding to each sweeping beam, where a width of the sweeping beam is superposed by beams corresponding to the one or more corresponding REs.

The latency step adjustment unit is configured to adjust a latency step based on a scheduling bandwidth.

The weight value configuration unit is configured to obtain, based on the latency step, precoding matrix weight values of the REs corresponding to the sweeping beam.

The weighted traversal unit is configured to perform, based on the precoding matrix weight values, weighted traversal on the REs corresponding to the sweeping beam.

In a possible implementation, the configured beam direction of the sweeping beam is staggered with a beam direction of a neighboring cell of the cell.

In a possible implementation, the communication apparatus 11 may further include: a symbol staggering unit, configured to: if a shutdown sweeping symbol is configured in the sweeping periodicity, stagger a time domain symbol of a transmit beam with a time domain symbol of a transmit beam of the neighboring cell.

It may be understood that for descriptions of the units in the communication apparatus 11, refer to embodiments of the corresponding communication method. Details are not described herein again.

Figure 12:
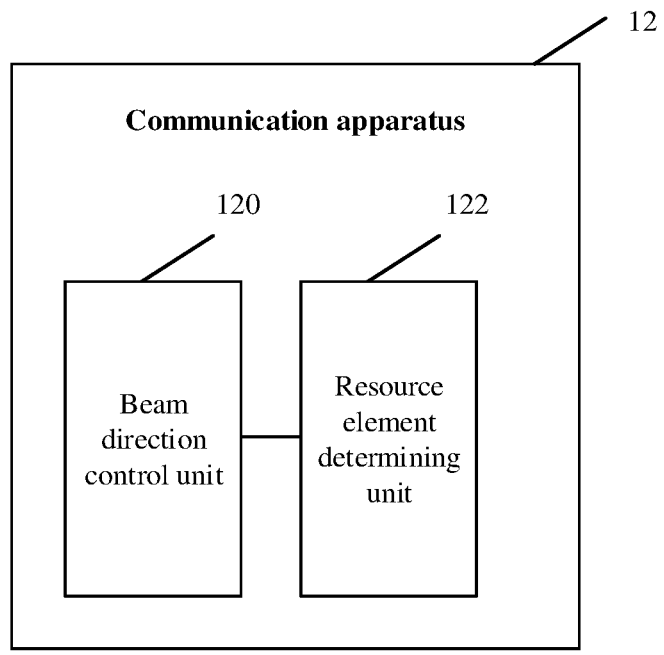
FIG. 12 is a schematic structural diagram of a communication apparatus according to another embodiment of this application.

An embodiment of this application further provides a communication apparatus. FIG. 12 is a schematic structural diagram of a communication apparatus according to another embodiment of this application. The communication apparatus 12 may include a beam direction control unit 120 and a resource element determining unit 122.

The beam direction control unit 120 is configured to: control a beam direction of a sweeping beam based on a position of a terminal device in a cell, and determine a quantity of sweeping beams.

The resource element determining unit 122 is configured to determine, based on the quantity of sweeping beams, one or more resource elements REs corresponding to each sweeping beam, where a width of the sweeping beam is superposed by beams corresponding to the one or more corresponding REs.

If the quantity of sweeping beams is reduced, the communication apparatus 12 may further include a shutdown symbol configuration unit, configured to configure a quantity of shutdown symbols based on the quantity of sweeping beams.

In a possible implementation, the communication apparatus 12 may further include a latency step adjustment unit, a weight value configuration unit, and a weighted traversal unit.

The latency step adjustment unit is configured to adjust a latency step based on a scheduling bandwidth after the resource element determining unit 122 determines, based on the quantity of sweeping beams, the one or more resource elements REs corresponding to each sweeping beam.

The weight value configuration unit is configured to obtain, based on the latency step, precoding matrix weight values of the REs corresponding to the sweeping beam.

The weighted traversal unit is configured to perform, based on the precoding matrix weight values, weighted traversal on the REs corresponding to the sweeping beam.

In a possible implementation, the communication apparatus 12 may further include: a power aggregation unit, configured to aggregate, on a configured symbol of the sweeping beam, power of an idle resource block RB to a to-be-occupied RB.

In a possible implementation, when current system load is at a first load level, the communication apparatus 11 triggers the beam direction control unit 120 to control the beam direction of the sweeping beam based on the position of the terminal device in the cell, and determine the quantity of sweeping beams.

Alternatively, when current system load is at a second load level and a proportion of the terminal device located in a first geographic area reaches a threshold, the communication apparatus 11 triggers the beam direction control unit 120 to control the beam direction of the sweeping beam based on the position of the terminal device in the cell, and determine the quantity of sweeping beams.

In a possible implementation, the configured beam direction is staggered with a beam direction of a neighboring cell of the cell.

In a possible implementation, the communication apparatus 11 may further include a symbol staggering unit, configured to: if a shutdown sweeping symbol is configured in a periodicity of a transmit beam, stagger a time domain symbol of the transmit beam with a time domain symbol of a transmit beam of the neighboring cell of the cell.

It may be understood that for descriptions of the units in the communication apparatus 12, refer to embodiments of the corresponding communication method. Details are not described herein again.

Figure 13:
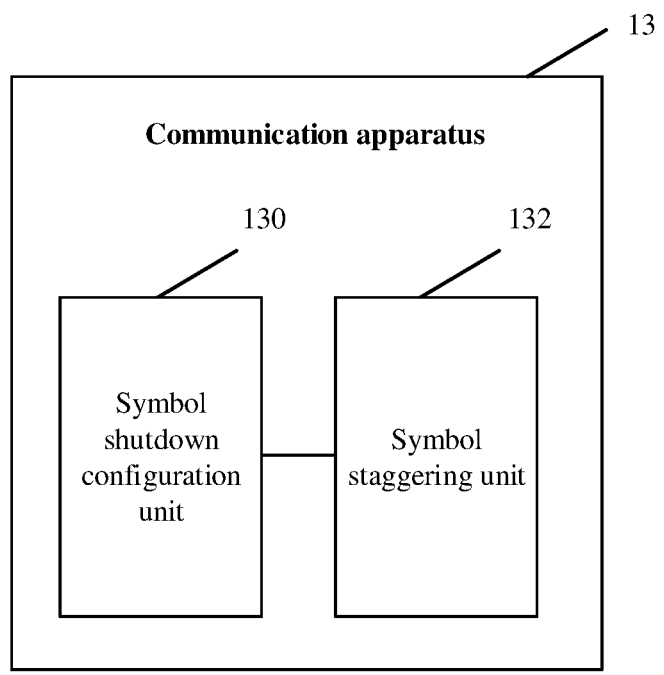
FIG. 13 is a schematic structural diagram of a communication apparatus according to another embodiment of this application.

An embodiment of this application further provides a communication apparatus. FIG. 13 is a schematic structural diagram of a communication apparatus according to another embodiment of this application. The communication apparatus 13 may include a symbol shutdown configuration unit 130 and a symbol staggering unit 132.

The symbol shutdown configuration unit 130 is configured to configure a shutdown sweeping symbol in a periodicity of a transmit beam.

The symbol staggering unit 132 is configured to: in a process of configuring a sweeping beam, stagger a time domain symbol of the transmit beam with a time domain symbol of a transmit beam of a neighboring cell of a current cell.

In a possible implementation, the communication apparatus 13 may further include: a power aggregation unit, configured to aggregate, on a configured symbol of the sweeping beam, power of an idle resource block RB to a to-be-occupied RB.

It may be understood that for descriptions of the units in the communication apparatus 13, refer to embodiments of the corresponding communication method. Details are not described herein again.

Figure 14:
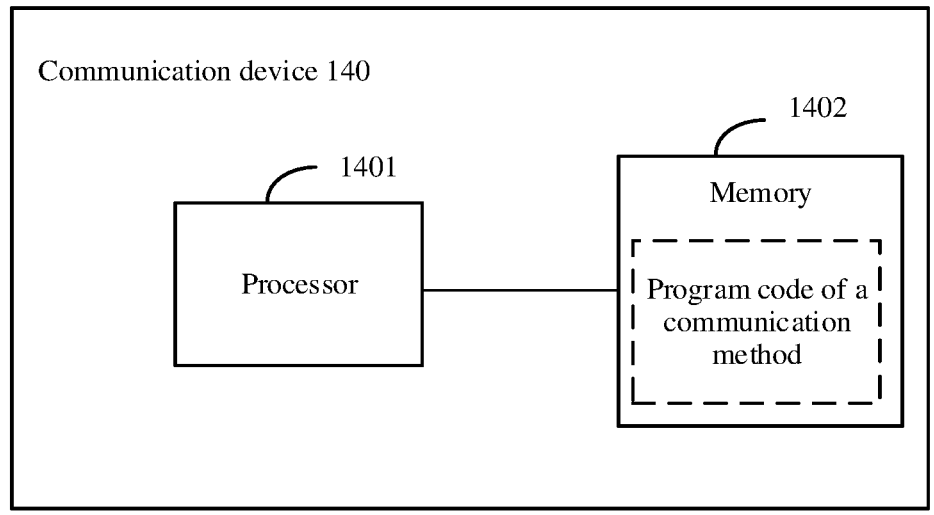
FIG. 14 is a schematic structural diagram of a communication device according to an embodiment of this application.

FIG. 14 is a schematic structural diagram of a communication device according to an embodiment of this application. The communication device 140 can perform the communication method provided in embodiments of the present invention. The communication device 140 may include at least one processor 1401 and a memory 1402, and the processor 1400 and the memory 1402 are connected to each other.

The processor 1401 may be a general-purpose central processing unit (CPU), a microprocessor, an application-specific integrated circuit (ASIC), or one or more integrated circuits configured to control program execution in the foregoing solution.

The processor 1401 may include a baseband processor (BBP) (not shown). The baseband processor processes a received digitalized signal, to extract information or a data bit transmitted in the signal. Therefore, based on a requirement or an expectation, the BBP is usually implemented in one or more digital signal processors (DSPs) in modulation and demodulation or implemented as a separated integrated circuit (IC).

The memory 1402 may be a read-only memory (ROM) or another type of static storage device that can store static information and instructions, or a random access memory (RAM) or another type of dynamic storage device that can store information and instructions, or may be but is not limited to an electrically erasable programmable read-only memory (EEPROM), a magnetic disk storage medium or another magnetic storage device, or any other medium that can carry or store expected program code in a form of instructions or a data structure and that can be accessed by a computer. The memory may exist independently, and is connected to the processor by using a bus. The memory may alternatively be integrated with the processor.

The communication device 140 may further include general-purpose components such as an antenna and a transceiver. Details are not described herein. The communication device 140 may further include the bus. The transceiver, the memory 1402, and the like may be connected to the processor 1401 by using the bus.

The memory 1402 may be configured to store program code for performing the communication method in the foregoing solution, and the processor 1401 controls the execution. Code stored in the memory 1402 may be used to perform the steps in the communication methods provided in FIG. 1 to FIG. 10. For details, refer to the implementations of the foregoing method embodiment. Details are not described herein again.

Figure 15:
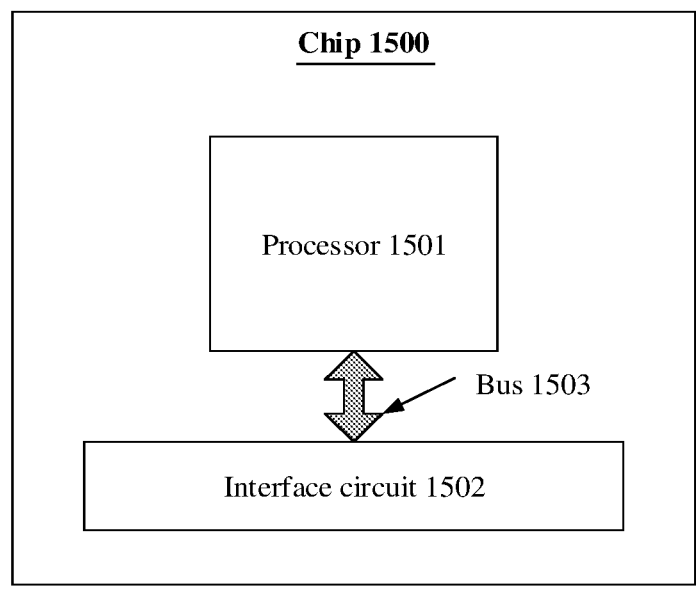
FIG. 15 is a schematic structural diagram of a chip according to an embodiment of this application.

Refer to FIG. 15. An embodiment of this application further provides a chip 1500, including one or more processors 1501 and an interface circuit 1502. Optionally, the chip 1500 may further include a bus 1503.

The processor 1501 may be an integrated circuit chip and has a signal processing capability. In an implementation process, the steps in the foregoing methods can be implemented by using a hardware integrated logical circuit in the processor 1501, or by using instructions in a form of software. The processor 1501 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods and steps that are disclosed in embodiments of this application. The general-purpose processor may be a microprocessor, or the processor may be any conventional processor or the like.

The interface circuit 1502 may send or receive data, instructions, or information. The processor 1501 may process data, instructions, or other information received through the interface circuit 1502, and send, through the interface circuit 1502, information obtained after processing.

Optionally, the chip further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform the steps in the communication methods provided in FIG. 1 to FIG. 10 by invoking operation instructions (where the operation instructions may be stored in an operating system) stored in the memory.

Optionally, the chip may be used in the electronic device, the network device, or the multi-node distributed system in embodiments of this application. Optionally, the interface circuit 1502 may be configured to output an execution result of the processor 1501. For the communication method provided in one or more embodiments of this application, refer to the foregoing embodiments. Details are not described herein again.

It should be noted that functions corresponding to each of the processor 1501 and the interface circuit 1502 may be implemented by using a hardware design, may be implemented by using a software design, or may be implemented by combining software and hardware. This is not limited herein.

An embodiment of this application further provides a computer-readable storage medium. The computer-readable storage medium stores instructions. When the instructions are run on a computer or a processor, the computer or the processor is enabled to perform one or more steps in any one of the foregoing methods. When the modules in the foregoing signal processing apparatus are implemented in a form of a software functional unit and sold or used as an independent product, the modules may be stored in the computer-readable storage medium.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A communication method comprising:
obtaining system load of a cell at a current moment;
configuring a quantity of sweeping beams in a sweeping periodicity based on the system load at the current moment;
configuring a quantity of shutdown symbols based on the quantity of sweeping beams, the quantity of shutdown symbols being beam sweeping symbols that are not to be used for beam sweeping; and
performing beam sweeping in the cell based on the quantity of sweeping beams and the quantity of shutdown symbols.

2. The method according to claim 1, wherein the method further comprises:
aggregating, on a configured symbol of a sweeping beam of the quantity of sweeping beams, power of an idle resource block (RB) to a to-be-occupied RB.

3. The method according to claim 1, wherein the system load at a lower load level indicates a smaller quantity of sweeping beams to be configured in the sweeping periodicity, and the system load at the lower load level is less than system load at a higher load level.

4. The method according to claim 1, wherein configuring the quantity of sweeping beams in the sweeping periodicity based on the system load at the current moment comprises:
estimating available power for beam sweeping based on the system load at the current moment; and
configuring the quantity of sweeping beams in the sweeping periodicity based on the available power.

5. The method according to claim 4, wherein the available power for beam sweeping comprises power of a to-be-occupied RB with power of an idle RB being aggregated to the to-be-occupied RB.

6. The method according to claim 1, wherein the method further comprises:
configuring a beam width of each sweeping beam based on the quantity of sweeping beams.

7. The method according to claim 6, wherein configuring the beam width of each sweeping beam based on the quantity of sweeping beams comprises:
determining, based on the quantity of sweeping beams, one or more resource elements (REs) corresponding to each sweeping beam, wherein the beam width of each sweeping beam is based on superposition of beams corresponding to the one or more REs.

8. An apparatus, comprising:
at least one processor, and a non-statutory memory storing instructions for execution by the at least one processor;
wherein, when executed, the instructions cause the apparatus to perform operations comprising:
obtaining a system load of a cell at a current moment;
configuring a quantity of sweeping beams in a sweeping periodicity based on the system load at the current moment;
configuring a quantity of shutdown symbols based on the quantity of sweeping beams, the quantity of shutdown symbols being beam sweeping symbols that are not to be used for beam sweeping; and
performing beam sweeping in the cell based on the quantity of sweeping beams and the quantity of shutdown symbols.

9. The apparatus according to claim 8, wherein, when executed, the instructions cause the apparatus further to perform operations comprising:
aggregating, on a configured symbol of a sweeping beam of the quantity of sweeping beams, power of an idle resource block (RB) to a to-be-occupied RB.

10. The apparatus according to claim 8, wherein the system load a lower load level indicates a smaller quantity of sweeping beams to be configured in the sweeping periodicity, and the system load at the lower load level is less than system load at a higher load level.

11. The apparatus according to claim 8, wherein configuring the quantity of sweeping beams in the sweeping periodicity based on the system load at the current moment comprises:
estimating available power for beam sweeping based on the system load at the current moment; and
configuring the quantity of sweeping beams in the sweeping periodicity based on the available power.

12. The apparatus according to claim 11, wherein the available power for beam sweeping comprises power of a to-be-occupied RB with power of an idle RB being aggregated to the to-be-occupied RB.

13. The apparatus according to claim 8, wherein, when executed, the instructions cause the apparatus further to perform operations comprising:
configuring a beam width of each sweeping beam based on the quantity of sweeping beams.

14. The apparatus according to claim 13, wherein configuring the beam width of each sweeping beam based on the quantity of sweeping beams comprises:
determining, based on the quantity of sweeping beams, one or more resource elements (REs) corresponding to each sweeping beam, wherein the beam width of each sweeping beam is based on superposition of beams corresponding to the one or more REs.

15. An apparatus, comprising:
at least one processor, and a non-transitory memory storing instructions for execution by the at least one processor;
wherein, when executed, the instructions cause the apparatus to perform operations comprising:
controlling a beam direction based on a position of a terminal device in a cell, and determining a quantity of sweeping beams based on the beam direction; and
determining, based on the quantity of sweeping beams, one or more resource elements (REs) corresponding to each sweeping beam of the quantity of sweeping beams, wherein a width of each sweeping beam is based on superposition of beams corresponding to the one or more REs.

16. The apparatus according to claim 15, wherein, when executed, the instructions cause the apparatus further to perform operations comprising:
adjusting a latency step based on a scheduling bandwidth;
obtaining, based on the latency step, precoding matrix weight values of the one or more REs corresponding to a sweeping beam; and
performing, based on the precoding matrix weight values, weighted traversal on the one or more REs corresponding to the sweeping beam.

17. The apparatus according to claim 15, wherein, when executed, the instructions cause the apparatus further to perform operations comprising:
aggregating, on a configured symbol of a sweeping beam of the quantity of sweeping beams, power of an idle resource block (RB) to a to-be-occupied RB.

18. The apparatus according to claim 15, wherein controlling the beam direction and determining the quantity of sweeping beams comprises:
  when current system load of the cell is at a first load level, or when the current system load of the cell is at a second load level and a proportion of the terminal device located in a first geographic area reaches a threshold, controlling the beam direction based on the position of the terminal device in the cell, and determining the quantity of sweeping beams.

19. The apparatus according to claim 15, wherein the beam direction is staggered with a beam direction of a neighboring cell of the cell.

20. The apparatus according to claim 19, wherein a shutdown sweeping symbol is configured in a periodicity of the quantity of sweeping beams being transmit beams, and a time domain symbol of a transmit beam is staggered with a time domain symbol of a transmit beam of the neighboring cell of the cell.

\* \* \* \* \*